(12) United States Patent
Poon et al.

(10) Patent No.: US 7,509,038 B2
(45) Date of Patent: Mar. 24, 2009

(54) DETERMINING MAXIMUM EXPOSURE TIME TO LIMIT MOTION BLUR DURING IMAGE CAPTURE

(75) Inventors: Eunice Poon, Scarborough (CA); Guoyi Fu, Toronto (CA); Ian Clarke, North York (CA)

(73) Assignee: Seiko Epson Corporation, Tokyo (JP)

( * ) Notice: Subject to any disclaimer, the term of this patent is extended or adjusted under 35 U.S.C. 154(b) by 451 days.

(21) Appl. No.: 11/239,521

(22) Filed: Sep. 29, 2005

(65) Prior Publication Data

US 2007/0071424 A1    Mar. 29, 2007

(51) Int. Cl.
*G03B 17/01* (2006.01)
*G03B 7/093* (2006.01)

(52) U.S. Cl. ............... 396/52; 396/246; 348/208.4; 348/362

(58) Field of Classification Search ............. 396/52–55, 396/169, 246; 348/208.15, 208.4, 208.1, 348/208.99, 362, E5.046
See application file for complete search history.

(56) References Cited

U.S. PATENT DOCUMENTS

| | | | | |
|---|---|---|---|---|
| 5,030,984 | A | * | 7/1991 | Buckler et al. ............... 396/153 |
| 5,995,761 | A | * | 11/1999 | Wakabayashi et al. ........ 396/54 |
| 6,603,508 | B1 | * | 8/2003 | Hata ........................ 348/229.1 |
| 6,630,950 | B1 | | 10/2003 | Ohkawara et al. |
| 6,778,210 | B1 | * | 8/2004 | Sugahara et al. ......... 348/208.4 |
| 6,778,768 | B2 | | 8/2004 | Ohkawara et al. |
| 7,330,569 | B2 | * | 2/2008 | Lin ............................ 382/107 |
| 2002/0154232 | A1 | | 10/2002 | Tull |
| 2002/0180874 | A1 | * | 12/2002 | Sobol ......................... 348/296 |
| 2004/0145673 | A1 | | 7/2004 | Washisu |
| 2004/0238718 | A1 | | 12/2004 | Washisu |
| 2004/0239771 | A1 | * | 12/2004 | Habe ..................... 348/208.12 |
| 2004/0239779 | A1 | | 12/2004 | Washisu |
| 2007/0212045 | A1 | * | 9/2007 | Yamasaki .................... 396/55 |

FOREIGN PATENT DOCUMENTS

| | | |
|---|---|---|
| JP | 02151180 | 6/1990 |
| JP | 03231576 | 10/1991 |
| JP | 06051384 | 2/1994 |
| JP | 200039640 | 2/2000 |
| JP | 2001268431 | 9/2001 |
| JP | 2004015376 | 1/2004 |
| JP | 2004304303 | 10/2004 |
| JP | 2005260481 | 9/2005 |
| JP | 2005260663 | 9/2005 |

* cited by examiner

*Primary Examiner*—Jay M Patidar
(74) *Attorney, Agent, or Firm*—Mark P. Watson

(57) ABSTRACT

A method, apparatus and image capture device for limiting motion blur during capture of an image predetermines a relationship between movement of the image capture device, time and blur extent. A rate of movement of the image capture device is obtained and used in conjunction with the determined relationship and a blur extent limit as a basis for obtaining a maximum exposure time for the image capture device in order to limit blur extent. On the basis of the maximum exposure time obtained and a required image brightness, the image capture device is configured, and then an image is captured by the image capture device. Once the image has been captured, due to the possibility of under-exposure from having limited the exposure time, the image is processed as required to increase its intensity.

24 Claims, 20 Drawing Sheets

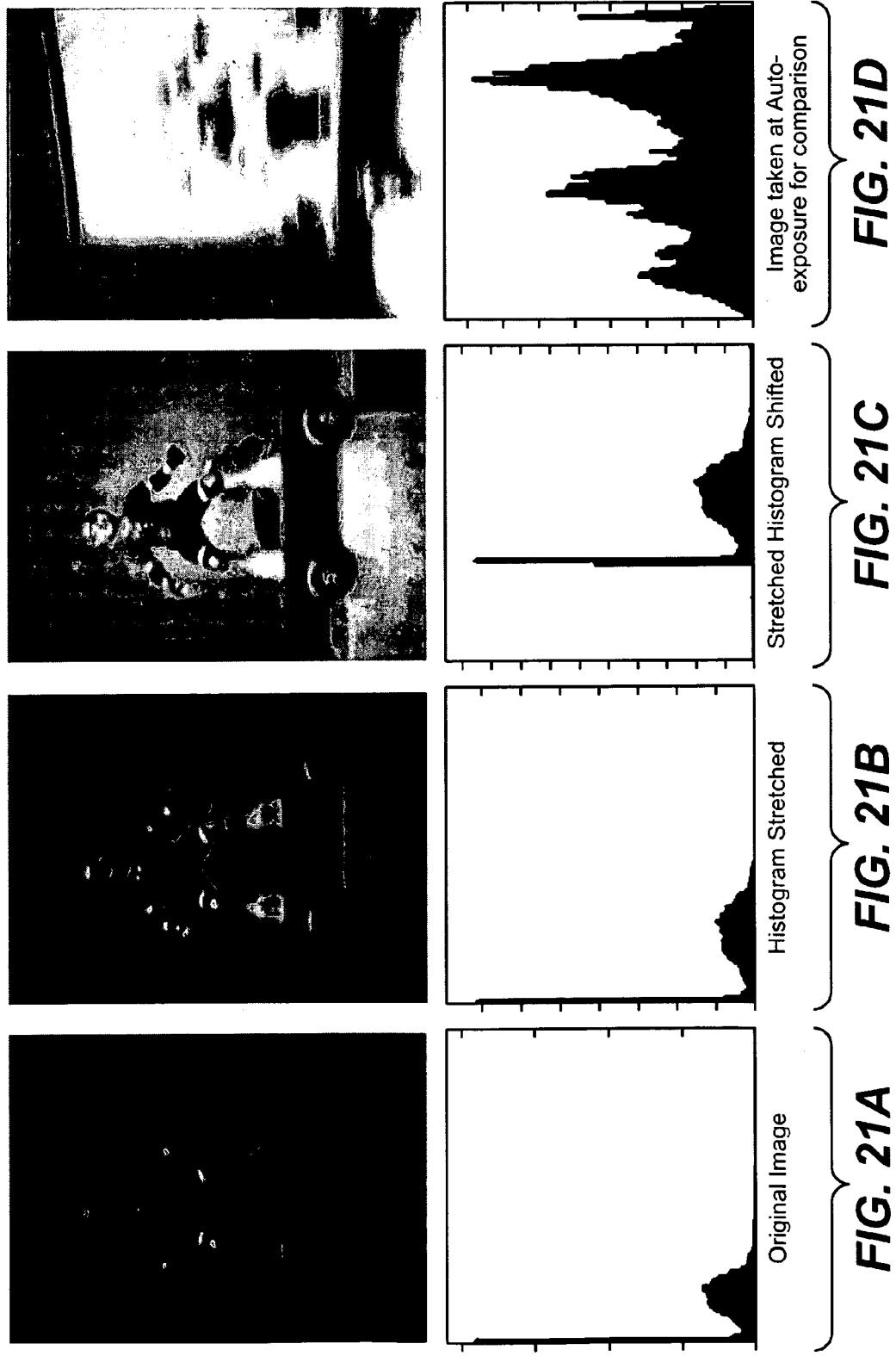

DETERMINING MAXIMUM EXPOSURE TIME TO LIMIT MOTION BLUR DURING IMAGE CAPTURE

FIELD OF THE INVENTION

The present invention relates generally to image capture and more specifically, to a method, apparatus and image capture device for limiting motion blur during capture of an image.

BACKGROUND OF THE INVENTION

Image capture devices such as digital cameras have become very popular due in part to a reduction in production costs, increase in overall quality, and particularly because camera functionality is being embedded into other electronic consumer devices such as cellular telephones and personal digital assistants (PDAs).

Image blur due to unsteady hand movement or the like during an image capture operation is often difficult to avoid for the inexperienced photographer or a user with an unsteady hand. Blur in an image is frustrating, as it detracts from the appeal of the image. With standard auto-exposure functions in image capture devices, low-light conditions are compensated for by lowering the shutter speed of the image capture devices, thereby increasing the exposure time in order to capture a bright enough image. This increase in exposure time increases the likelihood that movement will occur during the exposure time, thus increasing the likelihood of blur in the captured image. The same blur situation may arise if high-speed image capture device movement occurs during image capture, where the exposure time is normal.

Methods for post-processing a captured image to remove blur are known. These methods typically involve measuring the extent of blur in the captured image, and correcting for the measured blur. However, under very low-light and/or very high speed conditions that cause extensive blur, the extent of the blur can be so great that such post-processing cannot restore the image.

U.S. Pat. No. 6,778,210 to Sugahara et al. discloses a system that limits exposure time in a digital camera to keep blur within allowable or undetectable limits. The exposure time is adjusted based on the physical dimensions of the camera, on the basis that image blur relative to the imaging frame is inversely proportional to frame size and focal length. According to the Sugahara et al. method, in the event that the total manual or photometrically set exposure time exceeds the exposure time limit for acceptable blur, the camera is set to take a series of limited exposure images (their respective exposure times adding up to the total exposure time) by controlling the accumulation times of the image pickups. The images are subsequently processed for respective motion, correlated, and the motion is corrected. Each resultant image contains acceptable levels of blur, and results in an output image having an acceptable level of blur. One disclosed system recognizes reduced signal levels due to short exposure time and employs a velocity sensor instead of a motion correlation algorithm in order to quantify the motion.

U.S. Patent Application Publication No. 2004/0239771 to Habe discloses a method for controlling image blur quantity by adjusting the ISO speed setting of a digital camera. Prior to image capture, the camera in a blur prevention mode engages a vibration detector to, along with a known shutter speed and focal length, calculate a blur quantity. If the calculated blur quantity is greater than a predefined limit, the ISO speed of the camera is shifted to higher sensitivity by an extent that it is based on the ratio of calculated blur to the predetermined blur limit. In doing so, the aperture (i.e., field depth) is not changed. The method retains image quality by basing the adjustment of ISO speed on the image blur quantity, rather than on the shutter speed. While the ISO speed may be raised, it may also be lowered to gain higher-quality images having increased blur that is within acceptable limits.

While blur correction algorithms, and blur reduction and limiting methods are known, improvements are of course desirable. It is therefore an object to provide a method, apparatus and image capture device for limiting motion blur during image capture.

SUMMARY OF THE INVENTION

Accordingly, in one aspect there is provided a method of determining a maximum exposure time to limit motion blur during capture of an image with an image capture device, comprising:

determining extents of image blur that result from respective combinations of movement rate and exposure time of the image capture device;

in accordance with a predetermined blur extent limit and the combinations, deriving a relationship between movement rate and exposure time of the image capture device;

measuring a movement rate of the image capture device; and based on the measured movement rate and the relationship, obtaining the maximum exposure time.

In one embodiment, the determining comprises capturing a plurality of images using respective combinations of movement rate and exposure time of the image capture device and then measuring a blur extent in each of the captured images.

In another embodiment, the determining comprises defining a model of correlation between movement of the image capture device relative to a subject and resultant blur extent in pixels. Then blur extents resulting from rates of movement of the image capture device over time are calculated using the model.

According to another aspect there is provided a method of capturing an image with an image capture device, comprising:

determining a movement rate of the image capture device;

on the basis of the movement rate and a blur extent limit, obtaining a maximum exposure time from a predetermined relationship between movement rate and exposure time for the image capture device; and exposing an image sensor of the image capture device to capture an image, the exposing being limited in duration by the maximum exposure time.

In one embodiment, in the event that a measure of intensity of the captured image is less than a predetermined threshold, the intensity value of at least a portion of pixels in the captured image is automatically increased.

In a related embodiment, the amount of intensity increasing is based on a comparison between a measure of intensity of the captured image and a second measure of intensity that would be captured using an automatic exposure function of the image capture device in order to retain sufficient exposure.

According to another aspect there is provided an apparatus for determining a maximum exposure time to limit motion blur during capture of an image with an image capture device, comprising:

a processor determining extents of image blur that result from respective combinations of movement rate and exposure time of the image capture device and, in accordance with a predetermined blur extent limit and the determined combinations, deriving a relationship between movement rate and exposure time of the image capture device;

a storage device storing the relationship;

a gyro measuring a movement rate of the image capture device; and a lookup module determining from the relationship stored on the storage device the maximum exposure time-based on the measured movement and the predetermined blur extent limit.

In one embodiment, the processor performs the determining by defining a model of correlation between movement of the image capture device relative to a subject and resultant blur extent in pixels and calculates blur extents resulting from rates of movement of the image capture device over time using the model.

The model of correlation may be based on a simple lens model.

In accordance with still another aspect, there is provided an apparatus for controlling an image capture device during capture of an image, comprising:

a gyro determining a movement rate of the image capture device;

a processor for, on the basis of the movement rate and a blur extent limit, obtaining a maximum exposure time from a predetermined relationship between movement rate and exposure time for the image capture device and controlling the image capture device to expose an image sensor of the image capture device to capture an image, the exposing being limited in duration by the maximum exposure time.

In one embodiment, the apparatus comprises a post-processing module for, in the event that a measure of intensity of the captured image is less than a predetermined threshold, automatically increasing the intensity value of at least a portion of pixels in the captured image.

In accordance with yet another aspect, there is provided an image capture device, comprising:

an image sensor for capturing an image when exposed to light;

a gyro determining a movement rate of the image capture device;

a processor for, on the basis of the movement rate and a blur extent limit, obtaining a maximum exposure time from a predetermined relationship between movement rate and exposure time for the image capture device and controlling the image capture device to expose the image sensor of the image capture device to capture an image, the exposing being limited in duration by the maximum exposure time.

The subject method, apparatus and image capture device described herein provide numerous advantages. In particular, an image capture device employing the method is able to limit exposure time of its sensor to capture an image with an extent of blur due to image capture device motion that is tolerable. According to some embodiments, the image capture device is able to compensate for reduced exposure time to obtain images that are sufficiently bright by increasing sensitivity of an image capture sensor, increasing the aperture, or by employing an image-brightening process after image capture. According to still further embodiments, the exposure time limits for various combinations of angular velocity and acceptable blur extents are pre-calculated and stored in lookup tables, providing extremely fast operation at the time of image capture. In one advantageous embodiment, exposure time of the image capture device is limited only if the standard intensity-based automatic-exposure exposure time setting of the image capture device is greater than that which would yield the maximum acceptable blur extent.

BRIEF DESCRIPTION OF THE DRAWINGS

Embodiments will now be described more fully with reference to the accompanying drawings, in which:

FIG. 21 is an array of images and corresponding pixel intensity histograms illustrating the alternative steps of FIG. 20; and

DETAILED DESCRIPTION OF THE EMBODIMENTS

In the following description, a method, apparatus and image capture device for limiting motion blur during capture of an image is provided. During the method, a relationship is pre-determined between movement of the image capture device, time and blur extent. A rate of movement of the image capture device is obtained and used in conjunction with the determined relationship and a blur extent limit as a basis for obtaining a maximum exposure time for the image capture device in order to limit blur extent. On the basis of the maximum exposure time obtained and a required image brightness, the image capture device is configured, and then an image is captured by the image capture device. Once the image has been captured, due to the possibility of underexposure from having limited the exposure time, the image is processed as required to increase its brightness intensity.

The motion blur limiting method is particularly suited for use in conjunction with algorithms that automatically select exposure times based on only intensity requirements, in order to limit exposure time where the automatically-selected intensity-based exposure time would result in an unacceptable blur extent.

Figure 1:
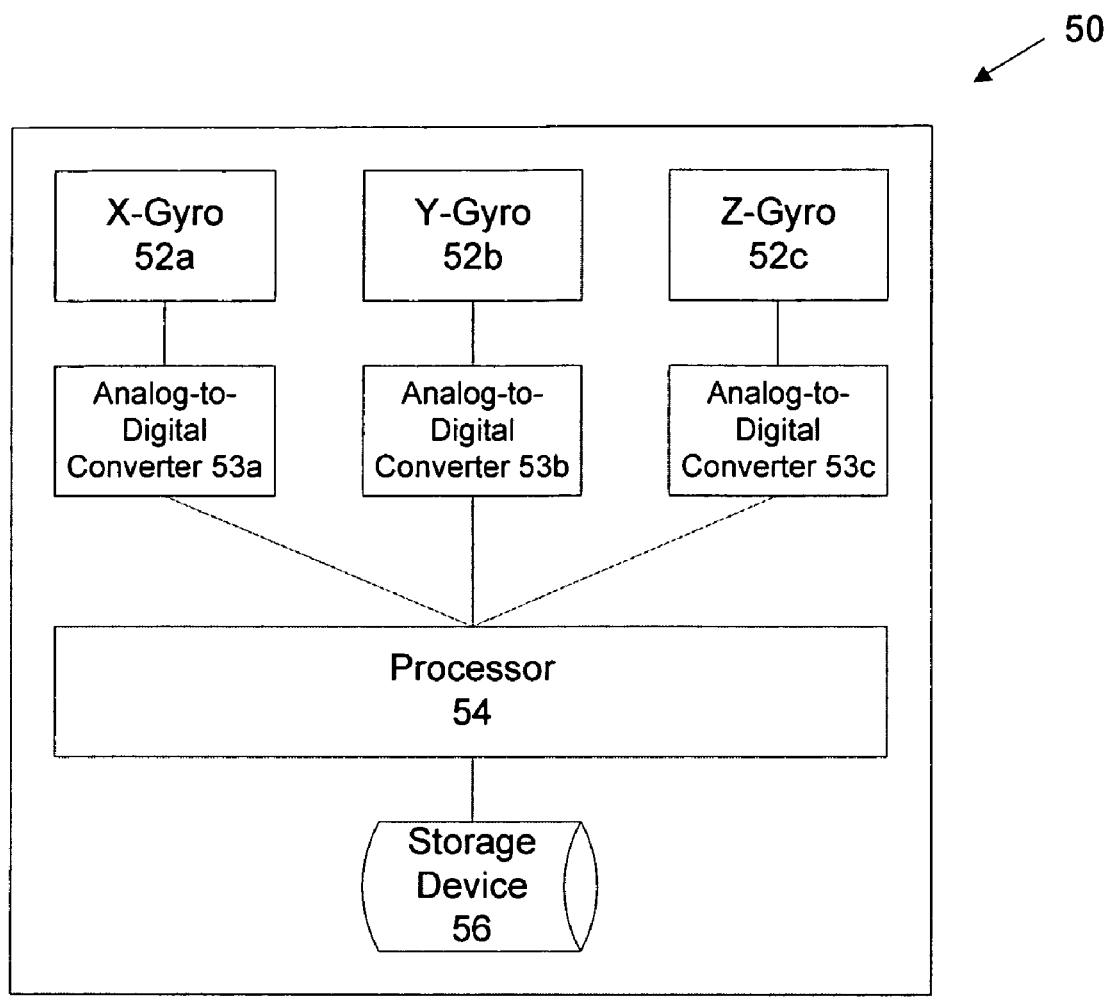
FIG. 1 is a block diagram of a motion blur limiting apparatus.
Figure 2:
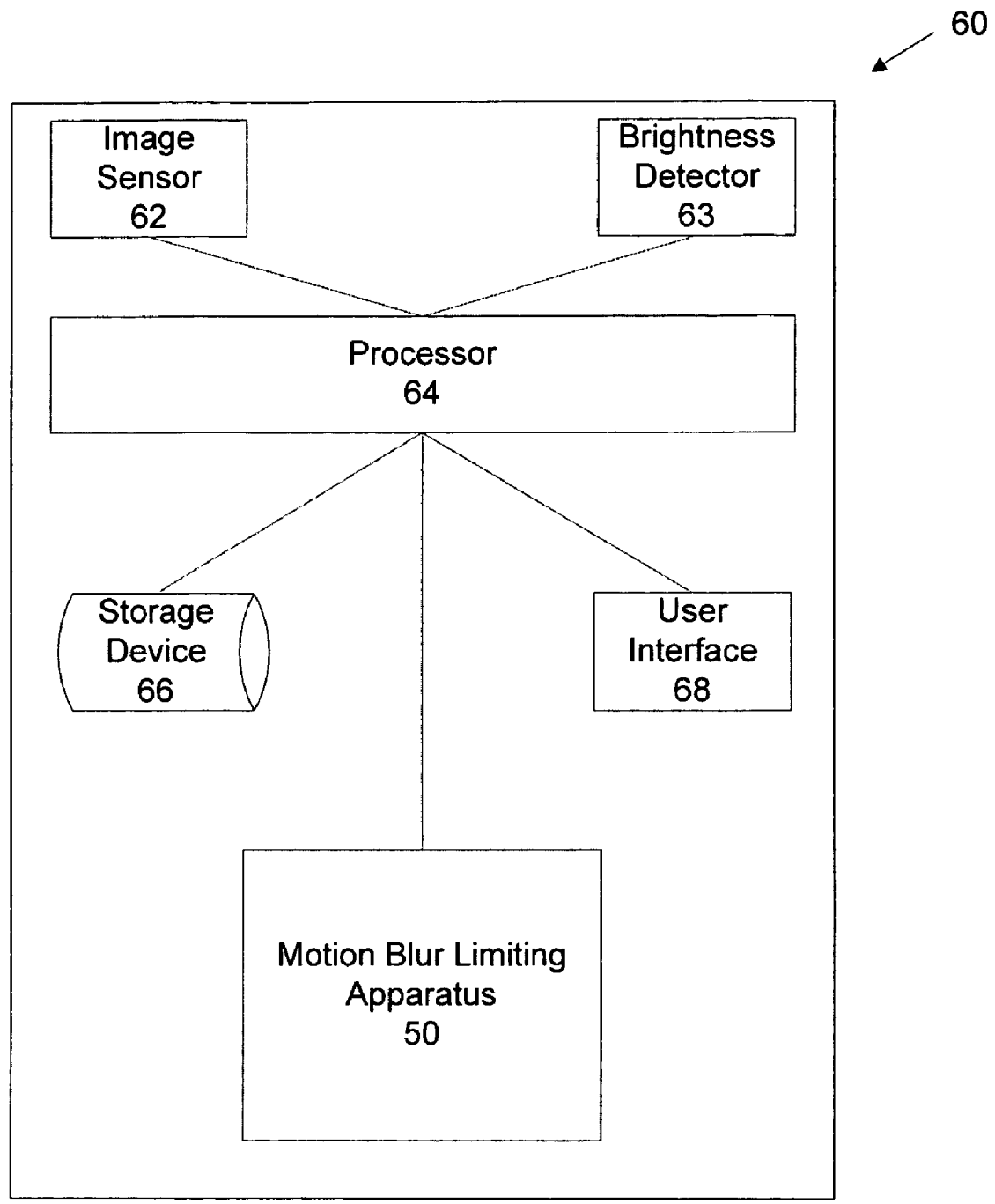
FIG. 2 is a block diagram of an image capture device incorporating the motion blur limiting apparatus of FIG. 1.

The motion blur limiting method and apparatus may be embodied in an image capture device such as a digital camera. FIG. 1 is a block diagram of a motion blur limiting apparatus 50, and FIG. 2 is a block diagram of an image capture device 60 incorporating the motion blur limiting apparatus 50 of FIG. 1.

Motion blur limiting apparatus 50 comprises gyros 52a, 52b, 52c for measuring a movement rate of the image capture device 60 in respective ones of three (3) dimensions (X, Y, Z), analog-to-digital converters 53a, 53b, 53c for converting the analog signals from the gyros 52a to 52c to digital signals, a processor 54, and a processor-readable storage device 56 for storing a software application embodied as processor-readable code which may include program modules such as routines, programs, object components, data structures, lookup modules etc. Based on data received from the gyros 52a to 52c, processor 54 retrieves, calculates or otherwise obtains from lookup tables and/or processor-readable code on storage device 56 a maximum exposure time for the image capture device 60 for limiting motion blur, as will be described.

The image capture device 60 comprises an image sensor 62 for capturing an image, a brightness detector 63 for detecting brightness of a subject, a processor 64 for configuring and controlling image sensor sensitivity, focal length, aperture, exposure time etc. of image capture device 60, a storage device 66 for storing processor-readable code such as routines, programs, object components, data structures etc. used by processor 64, and a user interface 68 for receiving user input settings used by processor 64 and storable by data storage device 66. The image sensor includes a charge-coupled device ("CCD"); that is, a light-sensitive integrated circuit that registers the data for an image in such a way that each pixel (picture element) in the image is converted into an electrical charge the intensity of which is related to a color in the color spectrum. Based on the maximum exposure time obtained by the motion blur limiting apparatus 50, image capture device 60 configures the image sensor 62 in accordance with detected subject brightness, captures an image using the image sensor 62, and brightens the captured image if it has been underexposed.

It will be understood that, based on design considerations, components of motion blur limiting apparatus 50 and image capture device 60 may be combined. For example, processors 54 and 64 may be the same processor. Similarly, storage device 56 and storage device 66 may be the same storage device.

Figure 3:
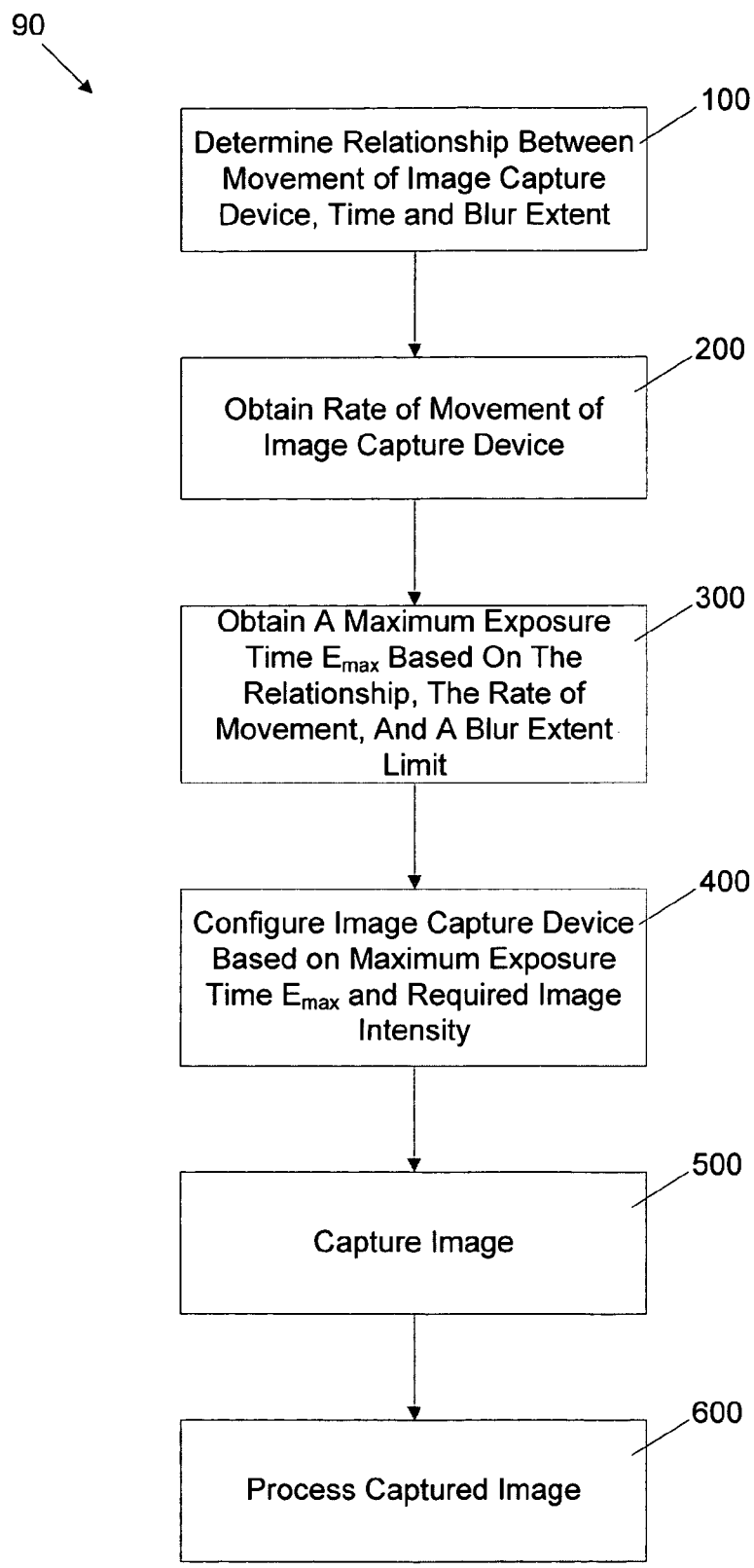
FIG. 3 is a flowchart showing the steps performed to limit blur extent in an image captured using the image capture device of FIG. 2.

Turning now to FIG. 3, a flowchart showing the general steps performed to limit blur in a captured image is shown and generally identified by reference numeral 90. During blur extent limiting, a relationship is initially determined between movement of the image capture device, time and blur extent (step 100). A rate of movement of the image capture device is then obtained (step 200) and is used in conjunction with the determined relationship and a blur extent limit as a basis for obtaining a maximum exposure time for the image capture device (step 300). On the basis of the maximum exposure time obtained and a required image brightness, the image capture device is configured (step 400), and the image is captured by the image capture device (step 500). Once the image has been captured, it is processed as required to increase its intensity (i.e., brightness) (step 600).

Figure 4:
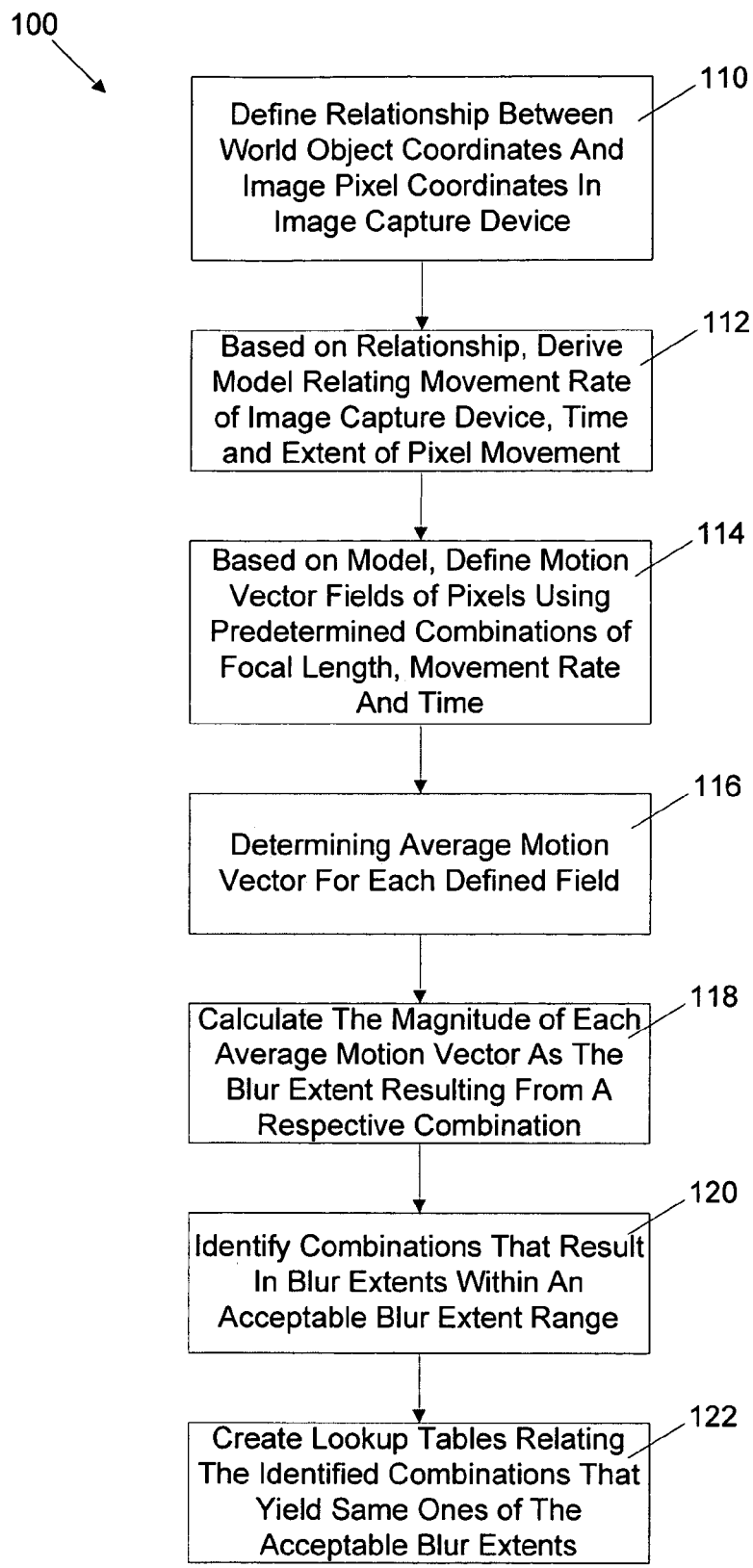
FIG. 4 is a flowchart showing steps for determining a relationship between movement of the image capture device, time and blur extent.

FIG. 4 is a flowchart showing the steps performed in order to determine the relationship between movement of the image capture device, time and blur extent at step 100 of FIG. 3. First, a relationship between world object coordinates and image pixel coordinates in the image capture device is defined (step 110). This relationship is defined using a simple lens model.

Figure 5:
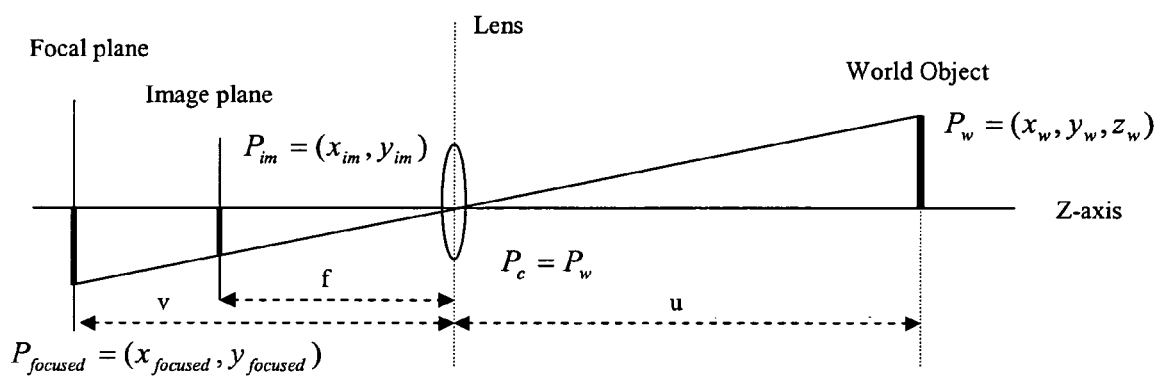
FIG. 5 is a schematic diagram showing a perspective image capture device model that is based on the simple lens concept.

FIG. 5 is a schematic diagram showing the defined image capture device model that is based on the simple lens model. As will be understood, the focal plane is parallel to the image plane. Based on an assumption that the lens employed is relatively thin and that its optical axis is perpendicular to the image plane, the lens operates according to the following lens law:

$$\frac{1}{u} + \frac{1}{v} = \frac{1}{f} \tag{1}$$

where:

u is the distance of a world object point from the lens plane;

v is the distance of the focused image from the lens plane; and f is the focal length of the lens.

The following discussion of the relationship between world object coordinates and image pixel coordinates employs the following terms:

F—Image capture device focal length;

$P_w = (x_w, y_w, z_w)$—Location of a point in world object coordinates;

$P_c = (x_c, y_c, z_c)$—Location of a point in image capture device coordinates;

$P_{im} = (x_{im}, y_{im})$—Location of a point in image plane coordinates;

$P_{focused} = (x_{focused}, y_{focused})$—Location of a point in focal plane coordinates;

P=(x, y)—Location of a point in image pixel coordinates;

$S_x$—Horizontal lens scaling factor;

$S_y$—Vertical lens scaling factor;

$x_0$—Horizontal principal point;

$y_0$—Vertical principal point;

λ—Model scaling factor;

α—Angle of image capture device rotation around X axis;

β—Angle of image capture device rotation around Y axis; and

θ—Angle of image capture device rotation around Z axis.

The relationship between world object coordinates and image pixel coordinates comprises four components. The first component of the relationship is a rotation and translation between the image capture device and world object coordinates:

$$P_c = R \cdot P_w + T \tag{2}$$

where:

R is a 3×3 rotation matrix defining rotations about X, Y and Z; and

T is a 3D translations vector defining translation between origins.

The second component of the relationship is a perspective projection from the world object coordinates to the image plane. This perspective projection is based on the simplified pinhole camera projection model:

$$\frac{x_{im}}{f} = \frac{x_c}{z_c} \text{ and } \frac{y_{im}}{f} = \frac{y_c}{z_c} \quad (3)$$

The third component, according to the simple lens model shown in FIG. 7, relates the focal plane of the image capture device and the image plane with the scaling factor λ that is a function of (u, v, f) as follows:

$$y_{focused} = y_{im} * \lambda \text{ and } x_{focused} = x_{im} * \lambda \quad (4)$$

where:

$(x_{im}, y_{im})$ is the projected point in 2D image plane coordinates;

$(x_{focused}, y_{focused})$ is the corresponding point in 2D focal plane coordinates; and λ is proportional to v/f and close to 1.

The fourth component of the relationship is a transformation between the focal plane and image pixel coordinates:

$$(y-y_0) = y_{focused}/S_y \text{ and } (x-x_0) = x_{focused}/S_x \quad (5)$$

The relationship between the world object coordinates and the image pixel coordinates is therefore a combination of Equations (2), (3), (4) and (5), as follows:

The coordinate projection CP can therefore be expressed as:

$$CP = \begin{bmatrix} \lambda \frac{F}{S_x} & 0 & 0 \\ 0 & \lambda \frac{F}{S_y} & 0 \\ 0 & 0 & 1 \end{bmatrix} = \begin{bmatrix} Fc1 & 0 & 0 \\ 0 & Fc2 & 0 \\ 0 & 0 & 1 \end{bmatrix} \quad (6)$$

and as:

$$\begin{bmatrix} x - x_0 \\ y - y_0 \\ 1 \end{bmatrix} = CP \cdot \begin{bmatrix} x_c \\ y_c \\ z_c \end{bmatrix} = CP \cdot \left( R \cdot \begin{bmatrix} x_w \\ y_w \\ z_w \end{bmatrix} + T \right) \quad (7)$$

The horizontal and vertical scaling factors $S_x$ and $S_y$, are calculated from the resolution of the image sensor 62 on the focal plane. The scaling factor λ is calibrated.

Based on the relationship between world object coordinates and image pixel coordinates defined in step 110, a model relating movement rate of the image capture device, time and extent of pixel movement is derived (step 112). According to this embodiment, the particular movement rate employed is angular velocity, as will be described.

The movement rate model described herein is, for simplicity and ease of understanding, based on an assumption that image capture device motion during the time the shutter is open is purely rotational. Under this assumption, the translation vector T is a zero vector:

$$T = \begin{bmatrix} 0 \\ 0 \\ 0 \end{bmatrix} \quad (8)$$

As a result, the image capture device model of Equation (7) can be simplified as follows:

$$\begin{bmatrix} x - x_0 \\ y - y_0 \\ 1 \end{bmatrix} = CP \cdot \begin{bmatrix} x_c \\ y_c \\ z_c \end{bmatrix} = CP \cdot R \cdot \begin{bmatrix} x_w \\ y_w \\ z_w \end{bmatrix} \quad (9)$$

The rotation matrix R in Equation (9) is calculated as follows:

$$R = R_x \cdot R_y \cdot R_z \quad (10)$$

The matrix representing rotation about the X-axis is:

$$R_x = \begin{bmatrix} 1 & 0 & 0 \\ 0 & \cos\alpha & \sin\alpha \\ 0 & -\sin\alpha & \cos\alpha \end{bmatrix} \quad (11)$$

The matrix representing rotation about the Y-axis is:

$$R_y = \begin{bmatrix} \cos\beta & 0 & \sin\beta \\ 0 & 1 & 0 \\ -\sin\beta & 0 & \cos\beta \end{bmatrix} \quad (12)$$

The matrix representing rotation about the Z-axis is:

$$R_z = \begin{bmatrix} \cos\gamma & \sin\gamma & 0 \\ -\sin\gamma & \cos\gamma & 0 \\ 0 & 0 & 1 \end{bmatrix} \quad (13)$$

As defined above, α, β, and γ are the angles rotated about the X-, Y- and Z-axes, respectively, and are related to angular velocity and exposure time as follows:

$$\alpha = \int_0^E G_x \, dt = \frac{E}{N} \sum_{i=1}^N G_x(i) \quad (14)$$

$$\beta = \int_0^E G_y \, dt = \frac{E}{N} \sum_{i=1}^N G_y(i)$$

$$\gamma = \int_0^E G_z \, dt = \frac{E}{N} \sum_{i=1}^N G_z(i)$$

where:

E is exposure period;

$G_x$, $G_y$ and $G_z$ are angular velocities obtained from the three (3) gyros 52a to 52c as will be described below; and N is the number of gyro samples obtained during exposure period E.

Prior to rotation, image capture device coordinates are aligned with the world object coordinates. Therefore, the rotation matrix prior to rotation is:

$$R = I = \begin{bmatrix} 1 & 0 & 0 \\ 0 & 1 & 0 \\ 0 & 0 & 1 \end{bmatrix} \quad (15)$$

With no rotation, the image pixel coordinates corresponding to the world object point $P_w=(x_w,y_w,z_w)$ can be represented by:

$$\begin{bmatrix} x_1 - x_0 \\ y_1 - y_0 \\ 1 \end{bmatrix} = CP \cdot R \cdot \begin{bmatrix} x_w \\ y_w \\ z_w \end{bmatrix} = CP \cdot \begin{bmatrix} x_w \\ y_w \\ z_w \end{bmatrix} \quad (16)$$

where:

$(x_1,y_1)$ are image pixel coordinates corresponding to point $P_w$ in world object coordinates.

After rotation, which as described above is assumed to be pure rotation about X, Y and Z axis while the shutter of the image capture device is open, the rotated angles are $\alpha$, $\beta$, and $\gamma$ respectively. The rotation matrix R is represented by Equation (10). Furthermore, the image pixel coordinates corresponding to the world object point $P_w=(x_w,y_w,z_w)$ prior to image capture device rotation are represented by Equation (16). From Equation (16), points $P_w=(x_w,y_w,z_w)$ in the world object coordinates can be represented as follows:

$$\begin{bmatrix} x_w \\ y_w \\ z_w \end{bmatrix} = CP^{-1} \cdot \begin{bmatrix} x_1 - x_0 \\ y_1 - y_0 \\ 1 \end{bmatrix} \quad (17)$$

For simplicity and clarity of description, it is assumed that the subject to be captured by the image capture device does not move during exposure. By substituting Equation (17) into Equation (9), a relationship for each pixel before and after rotation, in image coordinates, is obtained:

$$\begin{bmatrix} x_2 - x_0 \\ y_2 - y_0 \\ 1 \end{bmatrix} = CP \cdot R \cdot \begin{bmatrix} x_w \\ y_w \\ z_w \end{bmatrix} = CP \cdot R \cdot CP^{-1} \cdot \begin{bmatrix} x_1 - x_0 \\ y_1 - y_0 \\ 1 \end{bmatrix} \quad (18)$$

where:

$(x_2,y_2)$ is the image pixel coordinates of image corresponding to world object point $P_w$ after rotation of the image capture device; and $(x_1,y_1)$ is the image pixel coordinates corresponding to world object point $P_w$ prior to rotation of the image capture device.

With the model relating movement rate of the image capture device, time and extent of pixel movement having been determined at step 112, a number of combinations of focal length, movement rate (angular velocity) and time are inserted into the model to pre-define pixel movement as fields of motion vectors in each of the X-, Y- and Z-axis directions (step 114). A motion vector for each pixel in an image can be represented by:

$$\begin{bmatrix} x_2 - x_1 \\ y_2 - y_1 \\ 0 \end{bmatrix} = \begin{bmatrix} x_2 - x_0 \\ y_2 - y_0 \\ 1 \end{bmatrix} - \begin{bmatrix} x_1 - x_0 \\ y_1 - y_0 \\ 1 \end{bmatrix} \quad (19)$$

Figure 6:
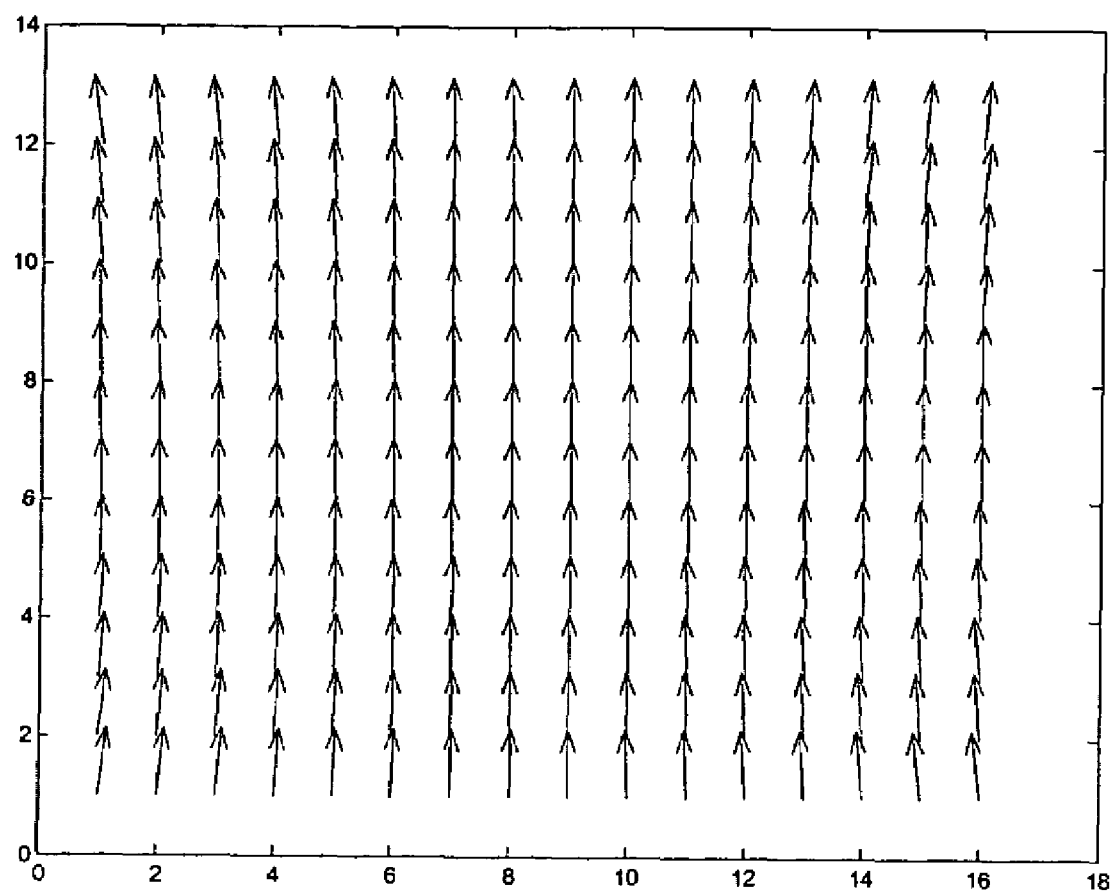
FIG. 6 is a diagram showing a field of motion vectors representing movement about the X-axis.
Figure 7:
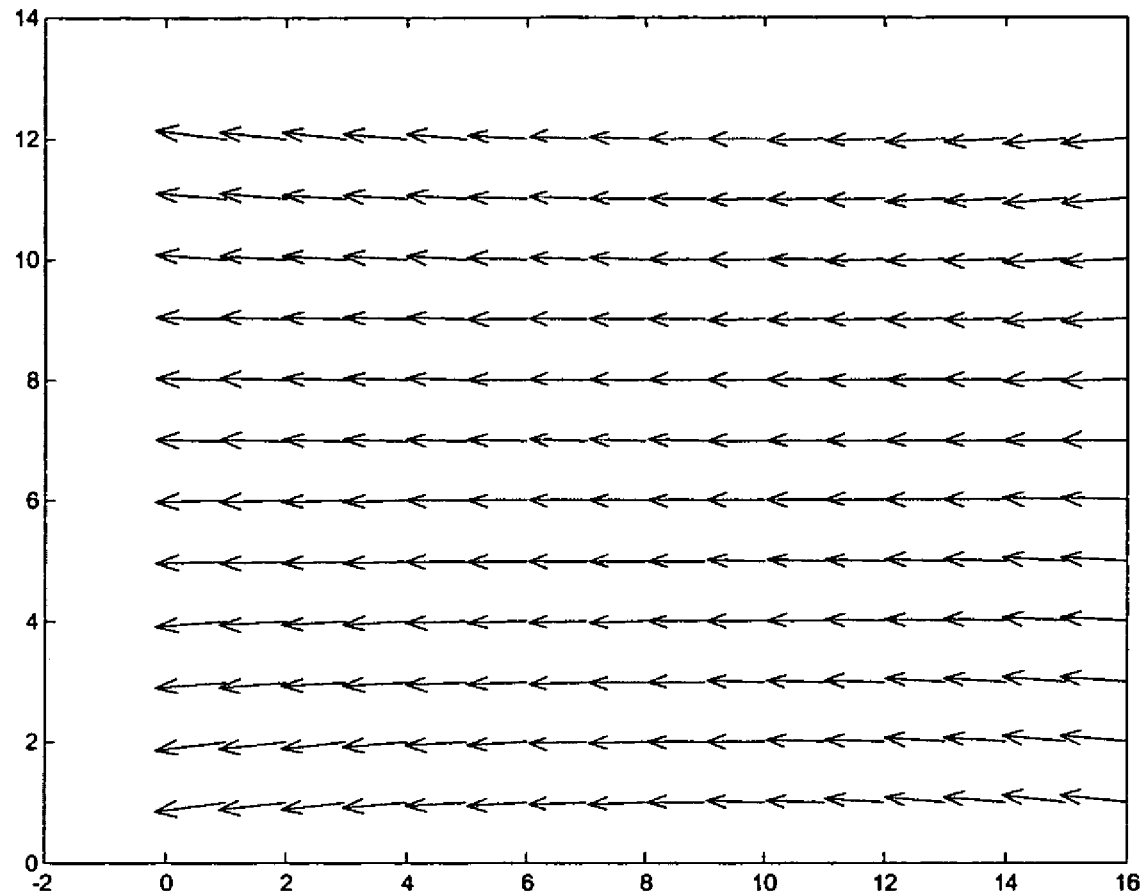
FIG. 7 is a diagram showing a field of motion vectors representing movement about the Y-axis.
Figure 8:
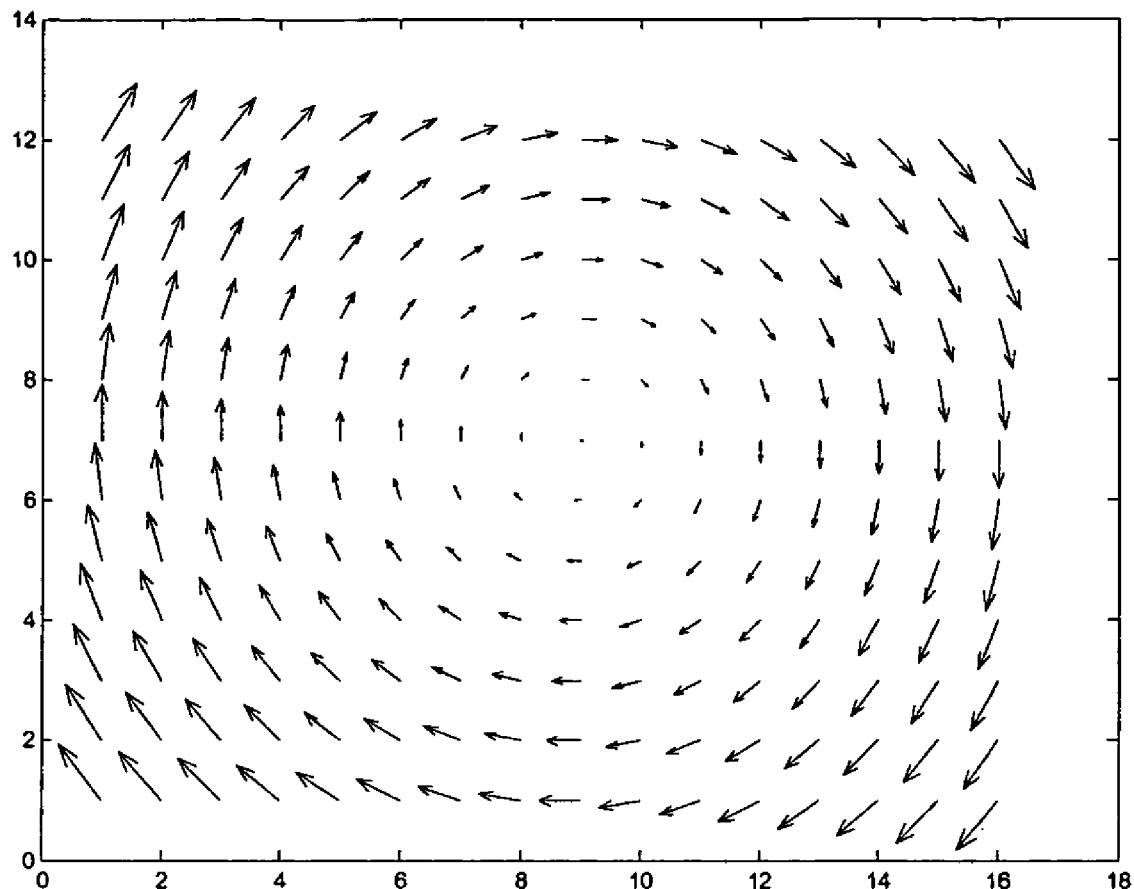
FIG. 8 is a diagram showing a field of motion vectors representing movement about the Z-axis.

FIGS. 6, 7 and 8 are diagrams showing fields of motion vectors representing rotation about the X-, Y- and Z-axes, respectively, for particular combinations of focal length, angular velocity, and time. In FIG. 6, under pure rotation about the X-axis, for each point $P=(x,y)$ in the image plane, the dominant motion vector is along the Y coordinate with a very slight shift in the X-coordinate. In FIG. 7, pure rotation about the Y-axis is shown, and for each point $P=(x,y)$ in the image plane, the dominant motion vector is along the X coordinate with a very slight shift in the Y coordinate. Pure rotation around the Z-axis is shown in FIG. 8.

A motion vector field is determined for each of the predetermined combinations. The combinations may be chosen during design of the image capture device 60 or motion blur limiting apparatus 50 based on how many focal lengths in a range are available using the image capture device, how many exposure times in a range may be set in the image capture device, and how many angular velocities in a range may be measured in the image capture device. It will be understood that the number of combinations may be limited by the physical capacity of the image capture device 60 or motion blur limiting apparatus 50 to store the multiple relationships, or other such design factors.

Once a field of motion vectors has been pre-defined for a particular rotation direction, a weighted average motion vector for each field is obtained (step 116):

$$WeightedAvgMotionVector = \begin{bmatrix} \Delta \bar{x} \\ \Delta \bar{y} \end{bmatrix} \quad (20)$$

$$= \frac{1}{W*H} \sum_{x=0}^{W-1} \sum_{y=0}^{H-1} M(x,y)$$

$$Weight(x,y)$$

where:

$M(x,y)$ is the motion vector; and $Weight(x,y)$ is a weight for the pixel at coordinates $(x,y)$.

The pixel weighting is applied in such a manner as to afford more weight to more centrally-located pixels in the field. It will be understood that pixel weighting may be adjusted experimentally based on design factors.

The extent and angle of the weighted average motion vector and therefore the motion of the pixels are calculated as follows:

$$MotionExtent = \sqrt{(\Delta \bar{x}^2 + \Delta \bar{y}^2)} \quad (21)$$

$$MotionAngle = \arctan\left(\frac{\Delta \bar{y}}{\Delta \bar{x}}\right) \quad (22)$$

The motion extent is the blur extent resulting from a particular combination of angular velocity and time (step 118). In order to simplify calculation of motion extents and angle, the weighted average motion vectors of nine (9) pixels are used to approximate the overall motion vector. Table 1 below shows the pixel locations and corresponding weights of the selected nine (9) pixels.

TABLE 1

| left-top: | middle-top: | right-top: |
|---|---|---|
| (0, 0) | (W/2, 0) | (W-1, 0) |
| weight: 1/16 | weight: 2/16 | weight: 1/16 |
| left-centre: | middle-centre: | right-centre: |
| (0, H/2) | (W/2, H/2) | (W-1, H/2) |
| weight: 2/16 | weight: 4/16 | weight: 2/16 |
| left-bottom: | middle-bottom: | right-bottom: |
| (0, H) | (W/2, H) | (W-1, H-1) |
| weight: 1/16 | weight: 1/16 | weight: 1/16 |

As described above, in order to reduce the amount of calculation by the image capture device during image capture, as well as to lessen the need for a powerful on-board processor, lookup tables for determining a maximum exposure time are pre-calculated. That is, for a given exposure time and angular velocity, motion (i.e. blur) extents can be pre-calculated using Equation (21). An exposure limit lookup table is determined for each combination of focal length and angular velocity, which stores the maximum exposure time that would result in an extent of motion blur that is acceptable.

Table 2 below is a one-dimensional lookup table containing pre-calculations of blur extent for image capture device rotation purely about the X-axis.

TABLE 2

| | ang. Vel. | | | | |
|---|---|---|---|---|---|
| Exp. time | 20 | 35 | 50 | 65 | 80 |
| 0.10 | 23.5 | 41.2 | 58.9 | 76.8 | 94.8 |
| 0.066 | 15.5 | 27.2 | 38.8 | 50.5 | 62.3 |
| 0.033 | 7.8 | 13.7 | 19.6 | 25.5 | 31.4 |
| 0.016 | 3.8 | 6.6 | 9.4 | 12.2 | 15.0 |
| 0.008 | 1.9 | 3.3 | 4.7 | 6.1 | 7.5 |
| 0.006 | 1.4 | 2.5 | 3.5 | 4.6 | 5.6 |

A number of acceptable blur extents may be selectable by a user. Lookup tables may be created using combinations of exposure time and angular velocity that result in the acceptable blur extents (step 120). For an acceptable blur extent of ten (10) pixels, an exposure limit lookup table can be obtained from Table 2, for each angular velocity, identifying the maximum exposure times resulting in motion extents less than or equal to the acceptable level (step 122). Table 3 below is such an exposure limit lookup table for an acceptable blur extent of ten (10) pixels.

TABLE 3

| | Angular Velocity | | | | |
|---|---|---|---|---|---|
| | 20 | 35 | 50 | 65 | 80 |
| $E_{max}$ for 10 pixels | 0.033 | 0.016 | 0.016 | 0.008 | 0.008 |

Table 4 below is an exposure limit lookup table for an acceptable blur extent of twenty-eight (28) pixels.

TABLE 4

| | Angular Velocity | | | | |
|---|---|---|---|---|---|
| | 20 | 35 | 50 | 65 | 80 |
| $E_{max}$ for 28 pixels | 0.10 | 0.066 | 0.033 | 0.033 | 0.016 |

Preferably, a three-dimensional exposure limit lookup table that supports image capture device rotation about X, Y and Z axis is employed. An example exposure limit lookup table entry for a particular extent of blur is shown in Table 5 below.

TABLE 5

| Angular Velocity Index | | | Exposure Limit |
|---|---|---|---|
| XX | YY | ZZ | $E_{max}$ |

A linear index may be employed for the exposure limit lookup table. That is, the spacing between velocities in the table may be linear. However, depending upon design considerations, one may wish to employ a logarithmic distribution of $G_x$, $G_y$, and $G_z$ in order to generate the lookup table. Such a logarithmic index would result in a higher proportion of exposure limits at very low angular velocities, in order to more accurately track an exposure limit for respective ones of the angular velocities at which small jitter tends to occur as a result of hand movement.

For a linear index, the angular velocity or gyro index values XX, YY and ZZ are calculated as follows:

$$XX=|G_x|*(n-1)/G_{max}$$

$$YY=|G_y|*(n-1)/G_{max}$$

$$ZZ=|G_z|*(n-1)/G_{max} \quad (23)$$

where:

$G_{max}$ is the maximum angular velocity of gyro output; and
n is the number of possible indices for each gyro in the exposure limit lookup table.

As can be seen, the index is scaled between 0 and n−1. The value of n can be varied based on the level of precision needed for the exposure limit lookup table. During testing, n=32 was used.

For a logarithmic index, the gyro index values XX, YY, ZZ are calculated as follows:

$$XX=\log_{10}(|G_x|*10)*(n-1)/\log_{10}(G_{max}*10)$$

$$YY=\log_{10}(|G_y|*10)*(n-1)/\log_{10}(G_{max}*10) \quad (24)$$

$$ZZ=\log_{10}(|G_z|*10)*(n-1)/\log_{10}(G_{max}*10)$$

Once the relationship between movement of the image capture device, time and blur extent has been determined and stored in lookup tables as described above, the image capture device 60 is ready for image capture.

Figure 9:
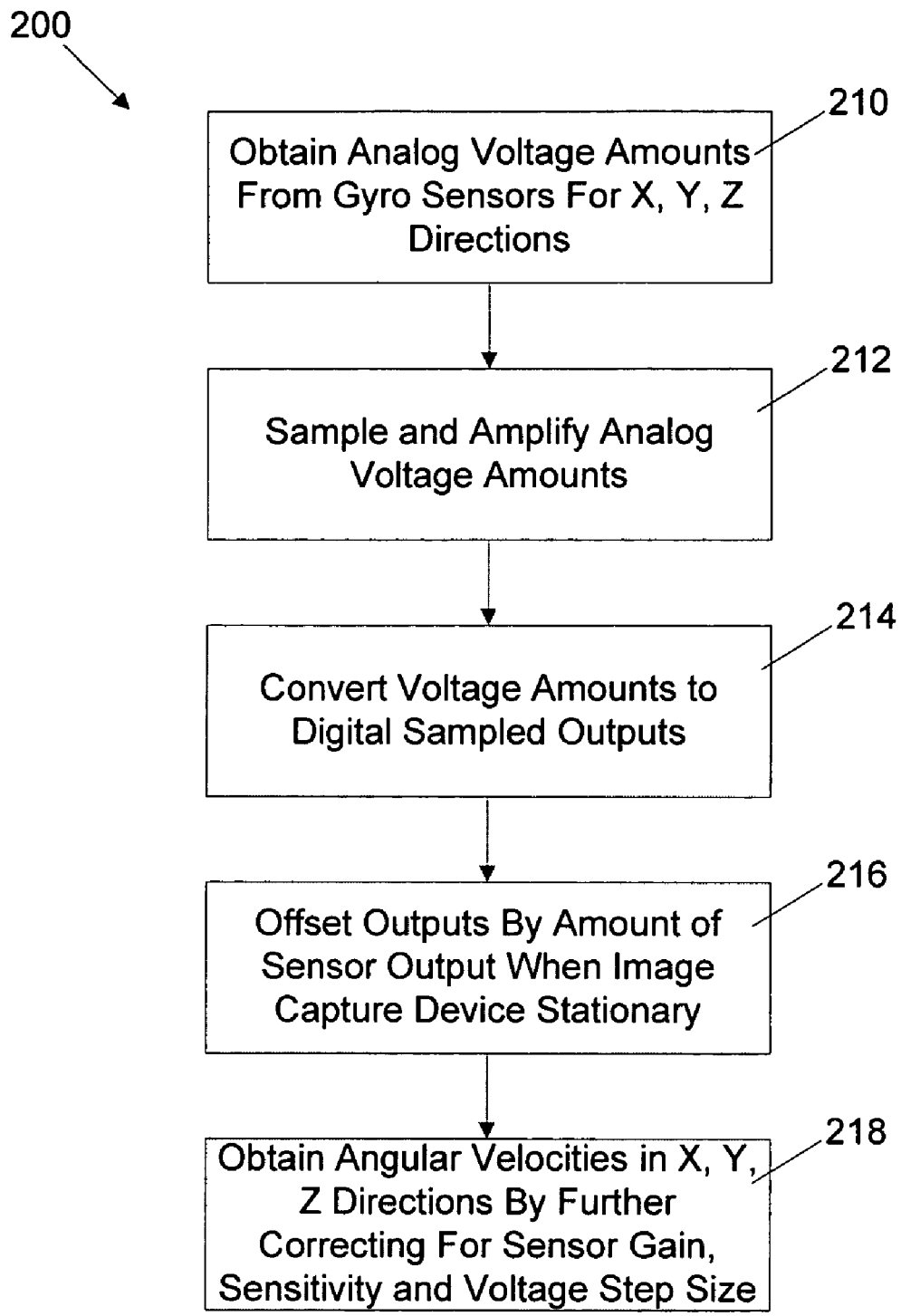
FIG. 9 is a flowchart showing steps for obtaining a rate of movement of the image capture device using gyros.

FIG. 9 is a flowchart showing steps for obtaining a rate of movement of the image capture device 60 from the gyros 52a to 52c for use in determining a corresponding maximum exposure time from the lookup tables, and ultimately for use in controlling the exposure time of the image capture device 60. First, an analog voltage output from each of the X, Y and Z gyros 52a to 52c is obtained (step 210). The voltage amounts are then sampled and amplified (step 212), and outputted from analog-to-digital converters as digital values (step 214). In order to yield true angular velocities, the digital values are corrected for static (i.e., zero-velocity) gyro output amounts (step 216) and further corrected for sensor gain, sensitivity, and voltage step size of the analog-to-digital converters (step 218). The following formulas are used to obtain the output angular velocities from the digital gyro outputs:

$$G_x = (G\_ADC_x - G\_Offset_x) * G\_AdcStepSize/G\_AdcConvertFactor)$$

$$G_y = (G\_ADC_y - G\_Offset_y) * G\_AdcStepSize/G\_AdcConvertFactor)$$

$$G_z = (G\_ADC_z - G\_Offset_z) * G\_AdcStepSize/G\_AdcConvertFactor) \quad (25)$$

where:

$G_x$, $G_y$ and $G_z$ are angular velocities;

$G\_ADC_x$, $G\_ADC_y$ and $G\_ADC_z$ are the digital gyro outputs;

$G\_Offset_x$, $G\_Offset_y$ and $G\_Offset_z$ are zero offsets;

$G\_AdcStepSize$ is the gyro analog-to-digital voltage step size; and $G\_AdcConvertFactor$ is the gyro analog-to-digital conversion factor.

$G\_AdcStepSize$ is calculated as follows:

$$G\_AdcStepSize = MaximumGyroVoltage/AdcStepNumber \quad (26)$$

$G\_AdcConvertFactor$ is calculated as follows:

$$G\_AdcConvertFactor = GyroSensitivity * AdcGain \quad (27)$$

A testing platform employing a PENGUIN board manufactured by Pixera™ of Los Gatos, Calif., U.S.A. with 10-bit ADC values and a 3.3 volt gyro output range was used. The gyro sensitivity was 0.67 mv/dps and the AdcGain was 100. As a result, the testing platform had a gyro analog-to-digital voltage step size $G\_AdcStepSize=3300/2^{10}=3.22$ and a gyro analog-to-digital conversion factor $G\_AdcConvertFactor=0.67*100=67$.

Figure 10:
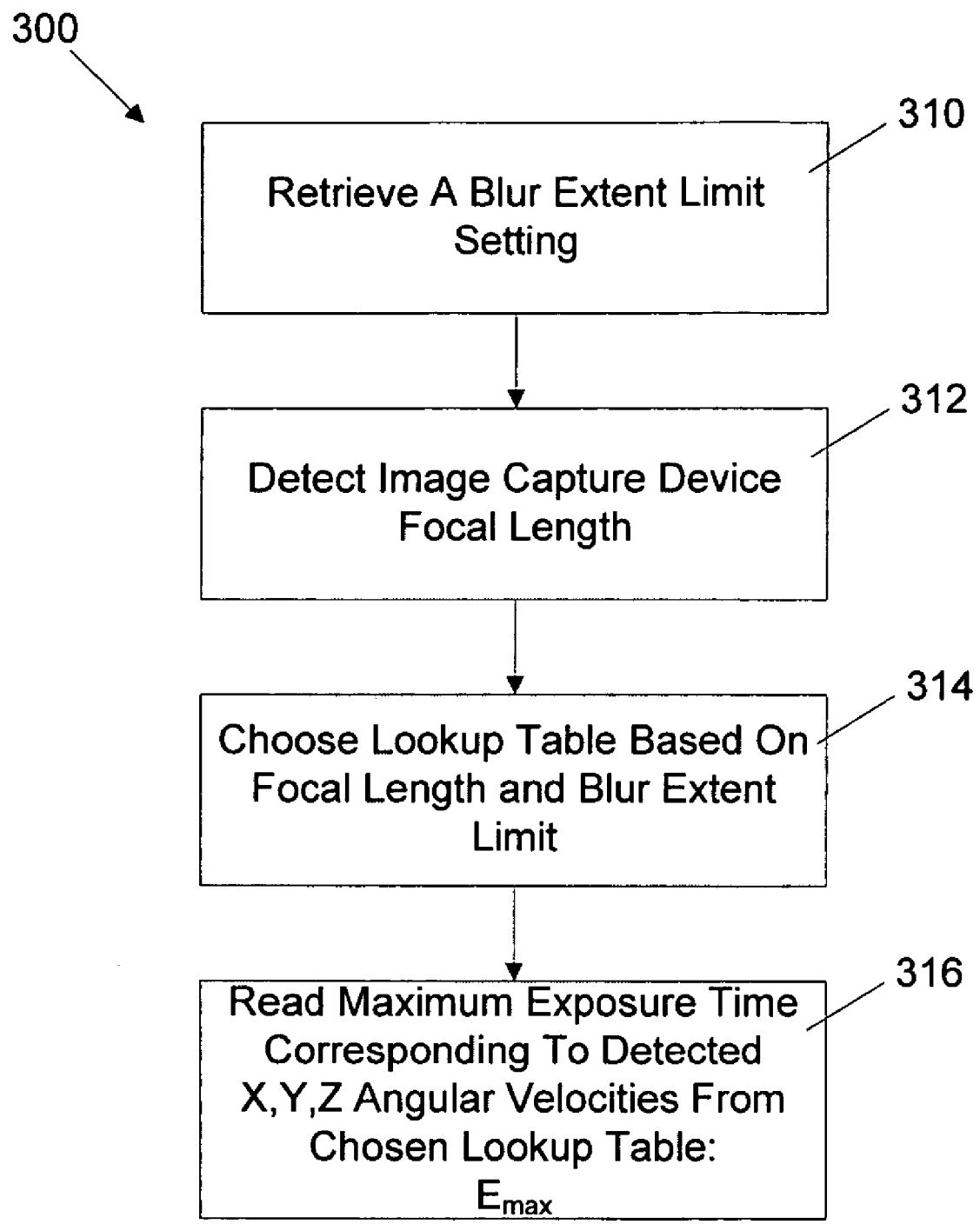
FIG. 10 is a flowchart showing steps for obtaining a maximum exposure time based on the relationship, the rate of movement of the image capture device and a blur extent limit.

With the angular velocities representing movement rate of the image capture device in the X-, Y- and Z-dimensions having been determined, a maximum exposure time $E_{max}$ that is based on the lookup tables, the angular velocities and a blur extent limit is obtained. FIG. 10 is a flowchart showing steps for obtaining a maximum exposure time $E_{max}$ based on the data in the lookup tables, the angular velocity of the image capture device and the blur extent limit. First, a predetermined blur extent limit is retrieved (step 310). This blur extent limit may be adjustable by a user to one of several available levels within a range. The focal length of the image capture device is then determined (step 312), and based on the focal length and blur extent limit, a lookup table (such as that shown in Table 5) is automatically chosen (step 314). Based on the detected X-, Y- and Z-angular velocities, a maximum exposure time $E_{max}$ is selected from the chosen lookup table (step 316).

Figure 11:
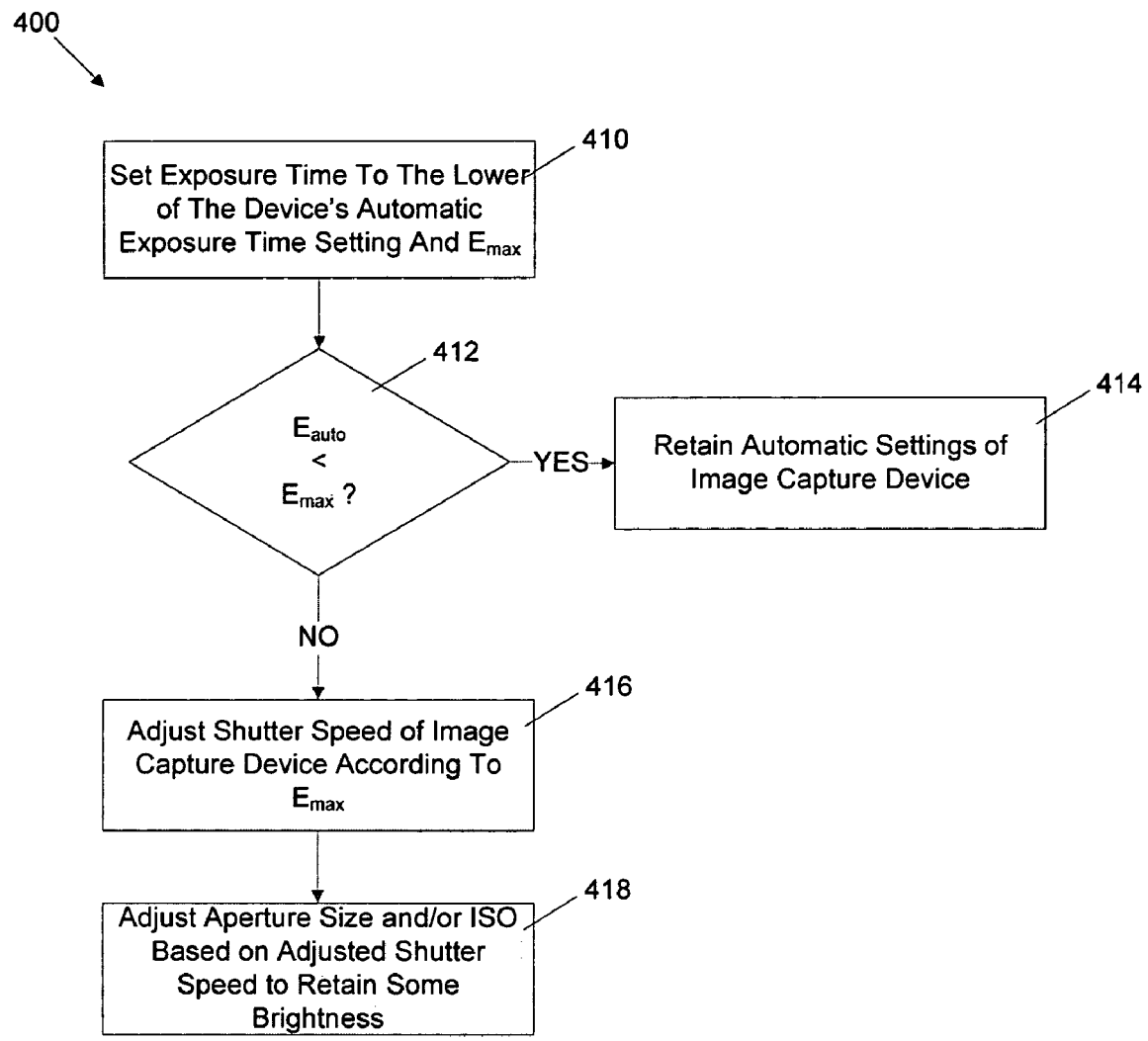
FIG. 11 is a flowchart showing steps for configuring the image capture device based on the maximum exposure time and required image intensity.

With the maximum exposure time $E_{max}$ having been selected from the lookup tables based upon the angular velocities and the predetermined blur extent limit, the image capture device 60 is configured to capture an image based upon the maximum exposure time $E_{max}$ and required image intensity. FIG. 11 is a flowchart showing steps for configuring the image capture device based on the maximum exposure time $E_{max}$ and required image intensity. According to this embodiment, the configuring steps make use of a standard intensity-based auto-exposure function of the image capture device 60.

First, the exposure time $E_{true}$ of the image capture device is set to the lower of $E_{max}$ and the standard (intensity-based) automatic exposure time setting $E_{auto}$ of the image capture device (step 410):

$$E_{true} = \min(E_{auto}, E_{max}) \quad (28)$$

If the automatic exposure time $E_{auto}$ is less than or equal to the maximum exposure time $E_{max}$ (step 412), then the image capture device retains the automatic brightness-based settings (step 414). In this case, no adjustments to the exposure time $E_{true}$ need to be made because any blur occurring during image capture will not exceed the blur extent limit corresponding to $E_{max}$. If, however, the automatic exposure time $E_{auto}$ is greater than $E_{max}$, then any resultant blur extent will be greater than the blur extent limit setting. In this case, the shutter speed of the image capture device is set to $E_{max}$ (step 416). Based on the adjusted shutter speed, the aperture size and ISO settings of the image capture device are automatically adjusted (step 418) in order to preserve intensity of a captured image.

As will be understood, according to the Additive Photographic Exposure System, exposure is balanced as follows:

$$Av + Tv = Sv + Bv \quad (29)$$

where:

Av=Aperture value;
Tv=Shutter speed or time value;
Sv=Sensitivity value or film speed value; and
Bv=Brightness value of subject.

These values are calculated as follows:

$$Sv = \log_2(ISO*N) \quad (30)$$

$$Bv = \log_2(B/NK) \quad (31)$$

$$Av = \log_2(F^2) \quad (32)$$

$$Tv = \log_2(1/T) \quad (33)$$

Advantageously, the standard auto-exposure function of many image capture devices such as digital cameras and the like calculate the exposure time automatically time according to Equation (29), resulting in:

$$Av_{auto} + Tv_{auto} = Sv_{auto} + Bv \quad (34)$$

When exposure time $E_{true}$ is reduced, shutter speed is increased:

$$Tv_{true} = \log_2(1/E_{true}) > Tv_{auto} = \log_2(1/E_{auto}) \quad (35)$$

It is reasonable to assume that for most cases, the focal length and brightness value of the subject to be captured by the image capture device will remain constant. In order to ensure sufficient exposure according to Equation (29), Av may be adjusted by changing the aperture size, Sv may be adjusted by changing the ISO setting, or both Av and Sv may be adjusted. A combination of the two adjustments supports a large range of exposure times.

Adjustments to aperture size Av only will now be described. It will be understood that the f-stop number is the relative aperture of the lens, indicating the amount of light that the lens lets into the image capture device:

$$f\_stop = \frac{FocalLength}{ApertureSize} \quad (36)$$

As long as the focal length is not changed, an increase in aperture size will decrease the f-stop. Furthermore, according to Equation (32), decreasing the f-stop decreases the aperture value, Av.

An exposure value (EV) is defined as:

$$EV = Av + Tv = Sv + Bv \quad (37)$$

If only the aperture size is adjusted, exposure value EV will not be changed because Sv and Bv are not changed. For proper exposure, $E_{true}$ and $Av_{true}$ are set to achieve the same exposure value as that of $E_{auto}$ and $Av_{auto}$:

$$Av_{auto} + TV_{auto} = Av_{true} + TV_{true} \quad (38)$$

Combining Equations (32) and (33), the following is obtained:

$$\log_2(1/E_{auto}) + \log_2(F_{auto}^2) = \log_2(1/E_{true}) + \log_2(F_{true}^2) \quad (39)$$

The f-stop value $F_{true}$ is obtained according to:

$$\frac{F_{true}}{F_{auto}} = \sqrt{\frac{E_{true}}{E_{auto}}} \quad (40)$$

The f-stop value for a specified $E_{true}$ can be calculated using Equation (40), or an exposure control table such as that shown in Table 6 below can yield the closest pair of aperture value and shutter speed.

For example, when the automatic exposure time is 1/125 and the f-stop is 16, then $EV_{auto} = \log_2(1/E_{auto}) + \log_2(F^2) = \log_2(125) + \log_2(162) = 6.97 + 8 = 14.98$, or approximately 15.

If $E_{true}$ is 1/500, the f-stop value can be calculated by Equation (40), $F_{true} = 16/2 = 8$. The exposure value, $EV_{true}$ is about 15.

TABLE 6

| f-stop | f/5.6 | f/8 | f/11 | f/16 |
|---|---|---|---|---|
| shutter | $TV^{AV}$ | 5 | 6 | 7 | 8 |
| 1/125 | 7 | 12 | 13 | 14 | 15 |
| 1/250 | 8 | 13 | 14 | 15 | 16 |
| 1/500 | 9 | 14 | 15 | 16 | 17 |
| 1/1000 | 10 | 15 | 16 | 17 | 18 |

Since the aperture size is only selectable from discrete values, the exposure value table of the shutter speed and aperture size is used to select a proper $(F'_{true}, E'_{true})$ pair which would yield the closest exposure value and aperture value with shutter speed within the exposure limit. This can be implemented in the form of a function that references the exposure value table:

$$(F_{true}, E_{true}) = \text{RoundUp}(F_{true}, E_{true}) \quad (41)$$

If $E_{true}$ is 1/800, and exposure value is 15, the f-stop value can be calculated using Equation (40), $F_{true} = 6.32$. According to Table 6, there are four combinations that will yield an exposure value of 15: 1/125 sec@f/16, 1/250 sec@ f11, 1/500@ f8 and 1/1000 sec@ f5.6. Among the options yielding an exposure value of 15, the $(F'_{true}, E'_{true})$ pair having a shutter speed within the limit is 1/1000 sec @ f5.6. The exposure time $E_{true} = 1/800$ will be adjusted to $E'_{true} = 1/1000$, and $F_{true} = F'_{true} = $ f5.6.

If $F_{true}$ is smaller than a minimum aperture value, $F_{min}$, there is no $(F'_{true}, E'_{true})$ combination in the exposure control table that would achieve the proper exposure value. In this case, the aperture size is set to the biggest aperture size available and $E_{true}$ is used to capture the image:

$$F_{true} = \max(F_{true}, F_{min}) \quad (42)$$

Adjustments to ISO setting Sv only will now be described. Equation (29) may be written as follows:

$$Av - Bv = Sv - Tv \quad (43)$$

If only Sv is adjusted, and aperture value Av is not changed, then Av−Bv will not change. According to Equation (43), the condition for proper exposure can be expressed as:

$$Sv_{auto} - Tv_{auto} = Sv_{true} - Tv_{true} \quad (44)$$

Based on Equations (30) and (33), Equation (44) can be written as follows:

$$\log_2(ISO_{auto}*N) - \log_2(1/E_{auto}) = \log_2(ISO_{true}*N) - \log_2(1/E_{true}) \quad (45)$$

$ISO_{true}$ can be obtained as follows:

$$\frac{ISO_{true}}{ISO_{auto}} = \frac{E_{auto}}{E_{true}} \quad (46)$$

For example, in the event that the automatic exposure time, $E_{auto}$, is 1/125, the ISO setting $ISO_{auto}$ is 100 and $E_{true} = 1/500$, then $ISO_{true}$ will be 400.

When increasing the sensitivity, the output of the sensor is amplified, so less light is required. However, it should be understood that amplification of the sensor undesirably amplifies noise also. Furthermore, when exposure time is reduced to a very short period in order to prevent motion blur in the cases of large amounts of movement, or when very low light conditions are encountered, an under-exposure image may be obtained even with a maximum aperture size. As such, adjustment of both Av and Sv may achieve better quality of captured image than adjustment of only one. As a basis for adjusting both Av and Sv, Equation (29) may be presented as follows:

$$Av + Tv - Sv = Bv \quad (47)$$

On the assumption that brightness Bv of the subject does not change, the following is obtained:

$$Av_{auto} + Tv_{auto} - Sv_{auto} = Av_{true} + Tv_{true} - SV_{true} \quad (48)$$

Based on Equations (30), (32), (33) and (48), the adjustment of both the aperture and ISO settings can be related as follows:

$$\frac{F_{auto}^2}{F_{true}^2} * \frac{ISO_{true}}{ISO_{auto}} = \frac{E_{auto}}{E_{true}} \quad (49)$$

In order to minimize the noise captured due to high ISO settings, the aperture size is adjusted first according to Equations (41) and (42), and then the ISO settings are adjusted according to Equation (49) as follows:

$$ISO_{true} = \frac{E_{auto}}{E_{true}} \frac{F_{true}^2}{F_{auto}^2} * ISO_{auto} \quad (50)$$

With the image capture device having been configured based on the maximum exposure time $E_{max}$ and required image intensity, the image capture device 60 is ready for image capture (step 500). Once an image is captured, it is processed as described below in order to brighten the image if it is underexposed by increasing the intensity of pixels in the image.

It is generally understood that electrons are freed when photons strike the silicon surface of a CCD of the image sensor 62. The electrons are transferred to a capacitor, and the voltage induced by the charged capacitor is measured, amplified and finally digitalized using an analog-to-digital converter.

The arrival of photons is modeled as a Poisson distribution, having the general property that the possibility of event occurrence is proportional to the duration of observation. As such, the arrival of photons is modeled as:

$$U = \lambda * T \quad (51)$$

where:

$\lambda = E(X)$ is the mean value of the Poisson distribution; and

T is the exposure time.

The gain of the image capture device is defined in decibels (dB), which is one-tenth of the common logarithm of the ratio of relative powers:

$$dB = 10 \log_{10} \frac{P_2}{P_1} \quad (52)$$

where:

$P_1$ and $P_2$ are the actual measures of power.

Power ratios may be expressed in terms of voltage and impedance, U and R, since:

$$P = U^2/R \quad (53)$$

Combining Equations (52) and (53), the dB gain can be expressed as:

$$dB = 10 \log_{10} \frac{P_2}{P_1} = 10 \log_{10} \frac{U_2^2/R}{U_1^2/R} = 20 \log_{10} \frac{U_2}{U_1} \quad (54)$$

For a digital camera in particular, the intensity of pixel value is proportional to output $U_2$ of the amplifier. The input signal $U_1$ is proportional to the arrival of photons. The gain of the digital camera can be represented in terms of pixel intensity value and the arrival of photons:

$$\text{Gain} = 20 \log_{10} \frac{U_2}{U_1} \quad (55)$$
$$= 20 \log_{10} \frac{\text{Intensity} * k_1}{\lambda * T * k_2}$$
$$= 20 \log_{10} \frac{\text{Intensity}}{\lambda * T} k$$

where:

$k = k_1/k_2$ is a constant; and

T is exposure time.

It is assumed that $E_{auto}$ and $G_{auto}$ can achieve a proper exposure. If it is desired to achieve the same exposure using $E_{true}$ and $G_{true}$, the following relationships based on Equation (55) are obtained:

$$\frac{\text{Intensity}_{true}}{\lambda * E_{true}} k = 10^{G_{true}/20} \quad (56)$$

$$\frac{\text{Intensity}_{auto}}{\lambda * E_{auto}} k = 10^{G_{auto}/20} \quad (57)$$

Combining Equations (56) and (57), the following is obtained:

$$\frac{\text{Intensity}_{true}}{\text{Intensity}_{auto}} * \frac{E_{auto}}{E_{true}} = \frac{10^{G_{true}/20}}{10^{G_{auto}/20}} \quad (58)$$

As will be understood, the relationship between an ISO setting and gain value is defined as:

$$\text{IsoValue} = \text{BaseIsoValue} * 10^{(GainValue - BaseGain)*/20} \quad (59)$$

Using Equation (59), the relationship between $G_{auto}$, $G_{true}$ and $ISO_{true}$, $ISO_{auto}$ can be expressed as follows:

$$\frac{ISO_{true}}{ISO_{auto}} = \frac{BaseIsoValue * 10^{(G_{true} - BaseGain)*/20}}{BaseIsoValue * 10^{(G_{auto} - BaseGain)*/20}} = \frac{10^{G_{true}/20}}{10^{G_{auto}/20}} \quad (60)$$

By combining Equation (60) with Equation (59) a relationship between intensity value, exposure time and ISO settings can be obtained:

$$\frac{\text{Intensity}_{true}}{\text{Intensity}_{auto}} = \frac{ISO_{true}}{ISO_{auto}} * \frac{E_{true}}{E_{auto}} \quad (61)$$

The gain compensation for proper exposure given a reduced exposure time may be expressed as follows:

$$\frac{ISO_{true}}{ISO_{auto}} = \frac{E_{auto}}{E_{true}} \quad (62)$$

Under proper conditions of exposure using gain compensation, the intensity value of an image captured using $E_{auto}$ and $G_{auto}$ will be the same as the intensity value of an image captured using $E_{true}$ and $G_{true}$ by substituting Equation (62) into Equation (61). That is:

$$\frac{\text{Intensity}_{true}}{\text{Intensity}_{auto}} = 1 \quad (63)$$

However, if there is either no gain compensation or insufficient gain compensation, the intensity value of the captured image taken using $E_{true}$ and $G_{true}$ will be darker than the intensity value of a captured image taken using $E_{auto}$ and $G_{auto}$:

$$\frac{\text{Intensity}_{true}}{\text{Intensity}_{auto}} = \frac{ISO_{true}}{ISO_{auto}} * \frac{E_{true}}{E_{auto}} < 1 \quad (64)$$

In order to brighten an underexposed captured image using $E_{true}$ and $G_{true}$, the intensity must be corrected by a "brighten" factor:

$$BrightenFactor = \frac{ISO_{auto}}{ISO_{true}} * \frac{E_{auto}}{E_{true}} \quad (65)$$

BrightenFactor is 1 if the proper exposure has been achieved by gain compensation:

$$Intensity_{brightened} = Intensity_{true} * BrightenFactor \quad (66)$$

It will be understood that Equation (66) is valid only in the case of ideal CCD sensors. If perfect CCDs were employed, there would be a direct relationship between the amount of light going into the lens and the brightness of the resultant pixels. That is, if brightness going into the lens were increased by two, the resultant pixels would be twice as bright. It will be understood, however, that real CCD sensors undergo saturation at high intensity.

A simple model of saturation during brightening is obtained by measuring a characteristic curve of CCD exposure, and then simulating an exposure process. Using 128 as the 'middle' exposure intensity, a saturation model is based on the following function:

$$Intensity_{saturated} = \quad (67)$$
$$\begin{cases} \frac{255}{1 + 128/Intensity_{brighten}} & Intensity_{brighten} \geq 128 \\ Intensity_{brighten} & Intensity_{brighten} < 128 \end{cases}$$

Figure 12:
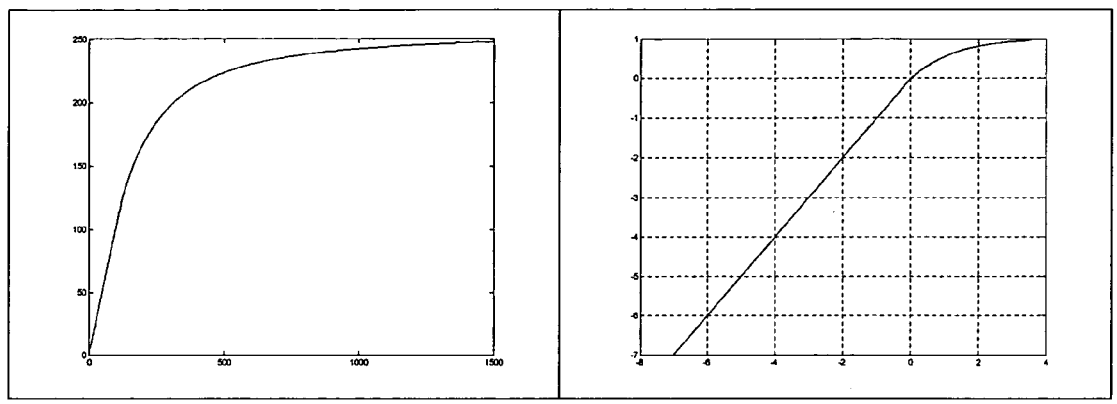
FIG. 12 is a diagram showing both linear and logarithmic image intensity saturation curves.
Figure 13:
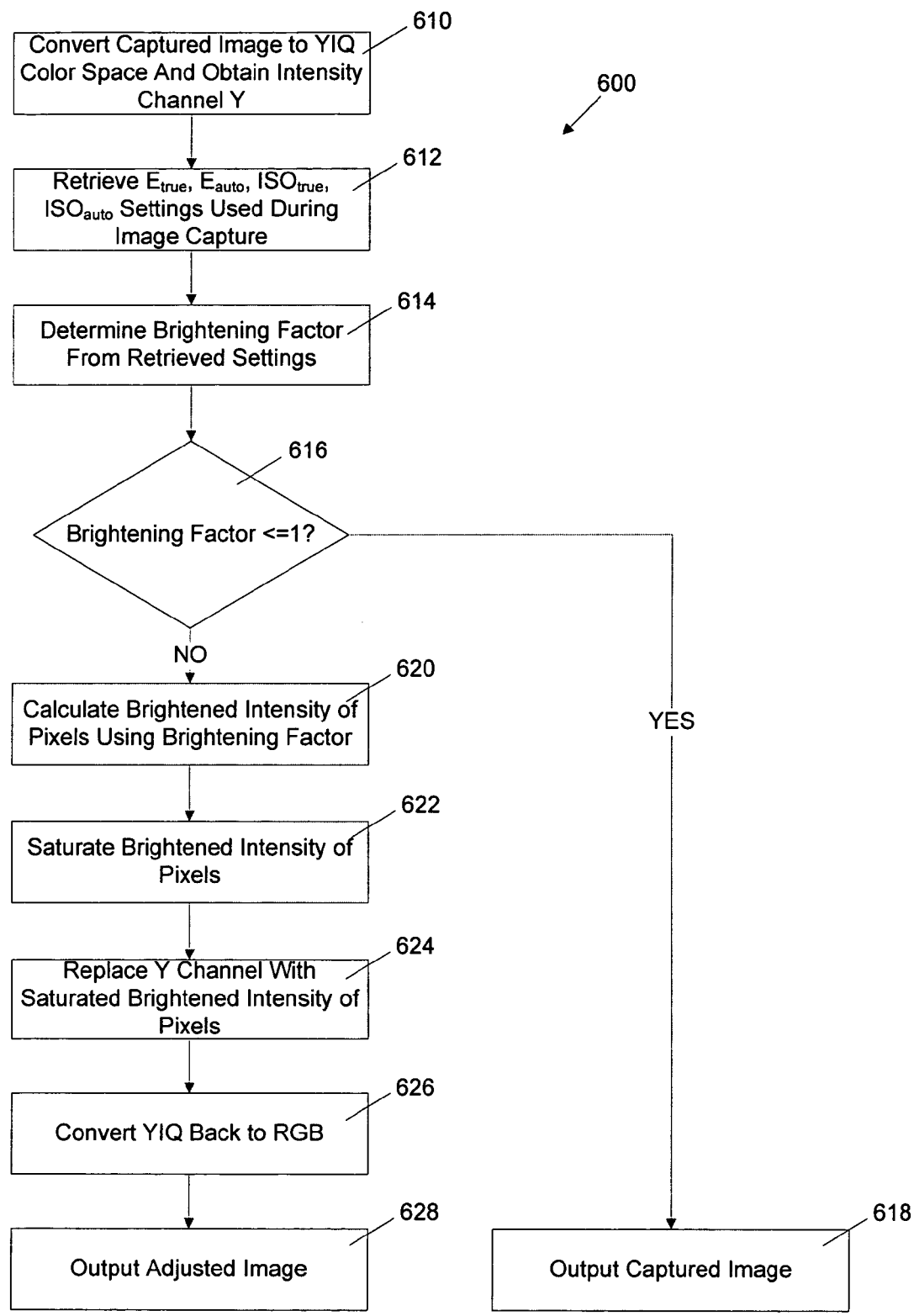
FIG. 13 is a flowchart showing steps for processing a captured image to increase intensity.

FIG. 12 shows both a linear intensity saturation curve and a logarithmic intensity saturation curve. On the basis of the saturation model, the captured image may be brightened. Referring to the flowchart of FIG. 13, the captured image is first converted to YIQ color space and the intensity channel Y obtained (step 610). The $E_{true}$, $E_{auto}$, $ISO_{true}$ and $ISO_{auto}$ settings that were used during image capture are retrieved (step 612) and the brighten factor BrightenFactor is calculated using Equation (65) (step 614). If the BrightenFactor is 1 or less than 1 (step 616), then application of BrightenFactor would either darken the captured image or have no effect, so simply the image as captured is output as the post-processed image (step 618). If, however, BrightenFactor is greater than 1, it is applied to the intensity channel Y of the captured image according to Equation (66) (step 620). According to Equation (67), the brightened pixel intensities are then saturated (step 622).

After the brightened pixel intensities have been saturated, the modified intensity channel Y replaces the one extracted from the YIQ image (step 624) and the modified YIQ image is converted back into RGB (step 626) and output (step 628) as the post-processed image.

Figure 14:
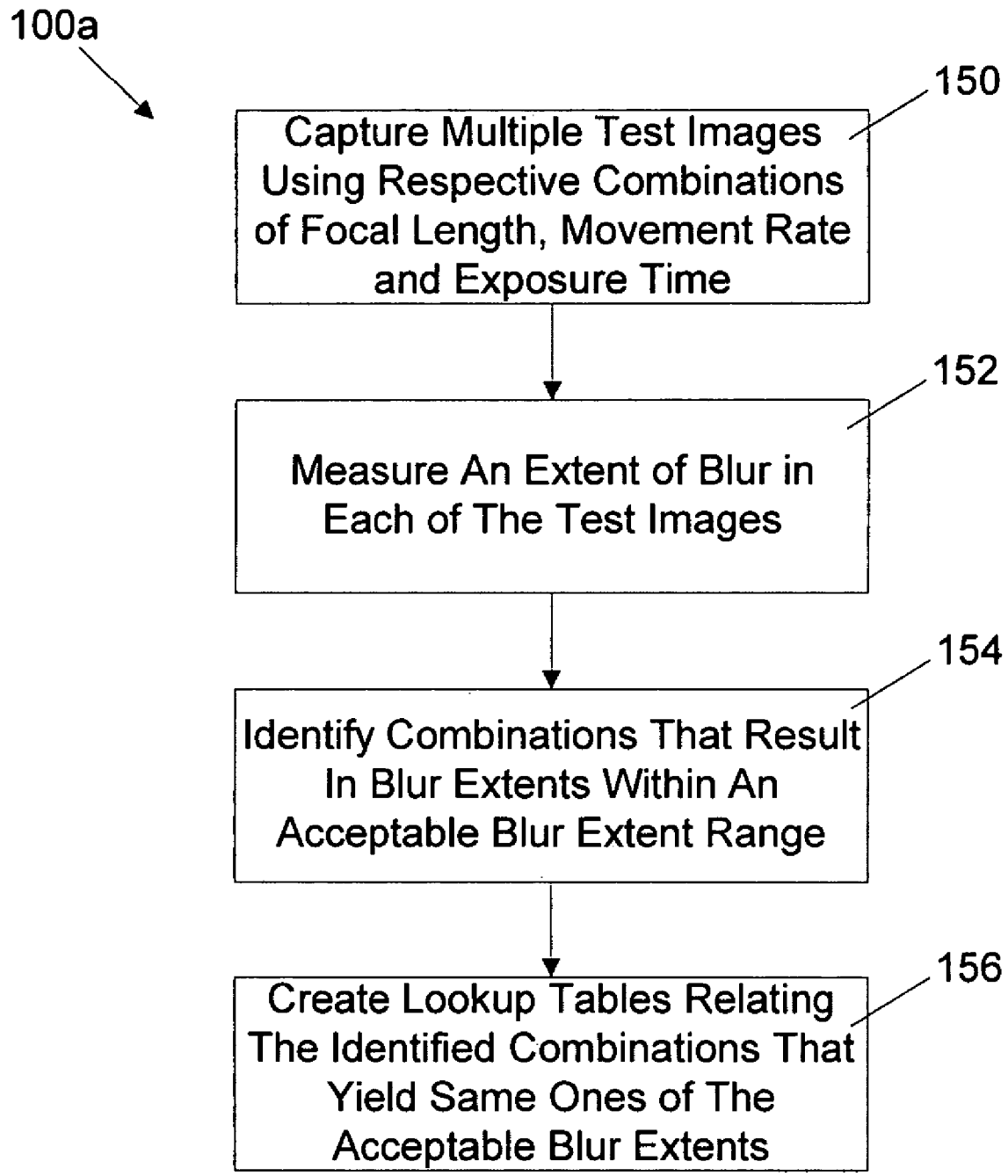
FIG. 14 is a flowchart showing alternative steps for determining a relationship between movement of the image capture device, time and blur extent.

In the above-described example, determination of a relationship between movement of the image capture device, time and blur extent is made on the basis of a predetermined, transformation-based model relating the image capture device movement, time and blur extent. However, one alternative to modeling the relationship is to capture test images using various combinations of image capture device movement rate and exposure time, and to measure blur extent in the test images. FIG. 14 is a flowchart showing the steps performed during this alternative technique 100a wherein test images for determining the relationship between movement of the image capture device, time and blur extent are captured.

Figure 15:
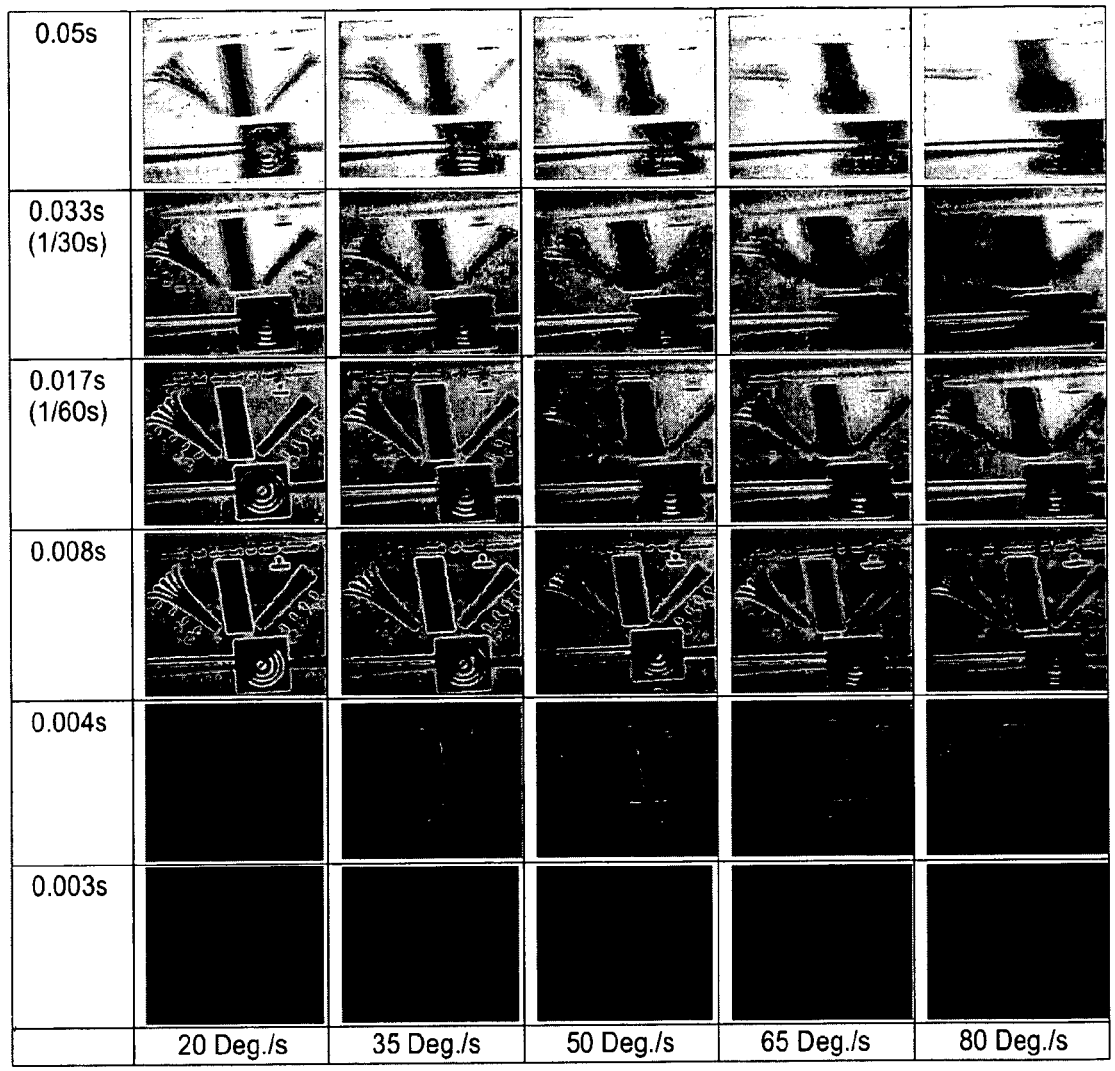
FIG. 15 is an array of test images taken at various combinations of exposure time and angular velocity of the image capture device used during the alternative steps of FIG. 12.
Figure 16:
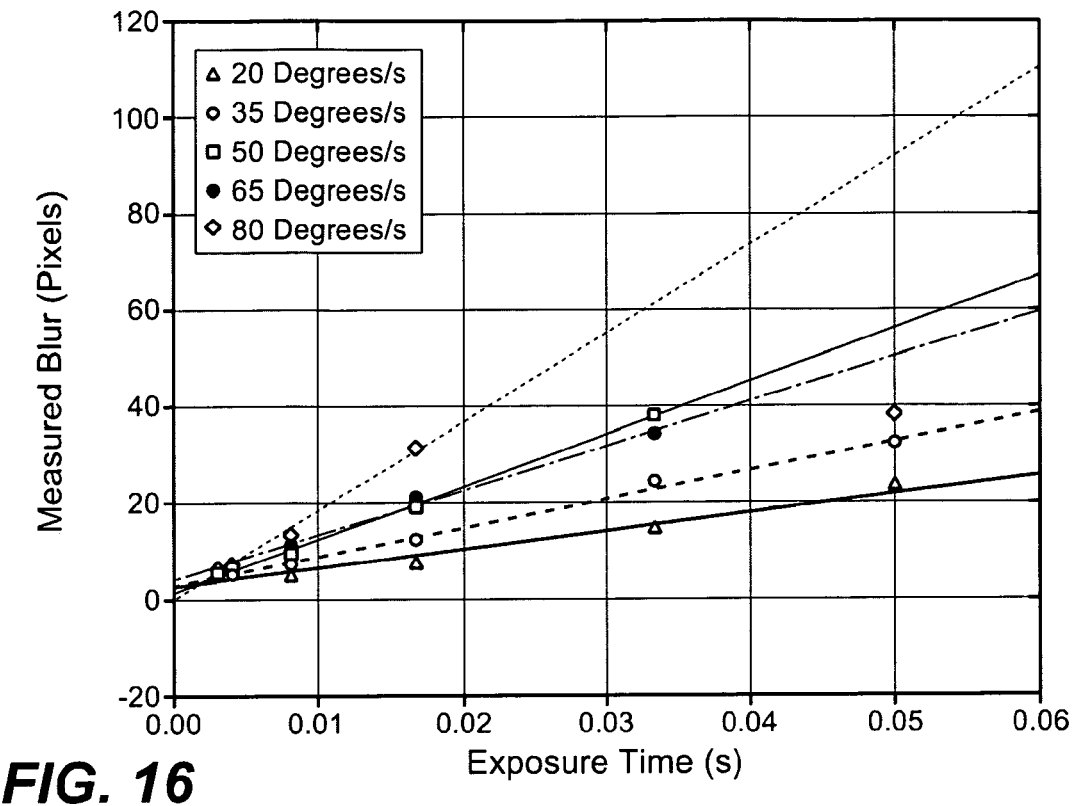
FIG. 16 is a graph showing a relationship between exposure time and blur extent measured in the images of FIG. 13.
Figure 17:
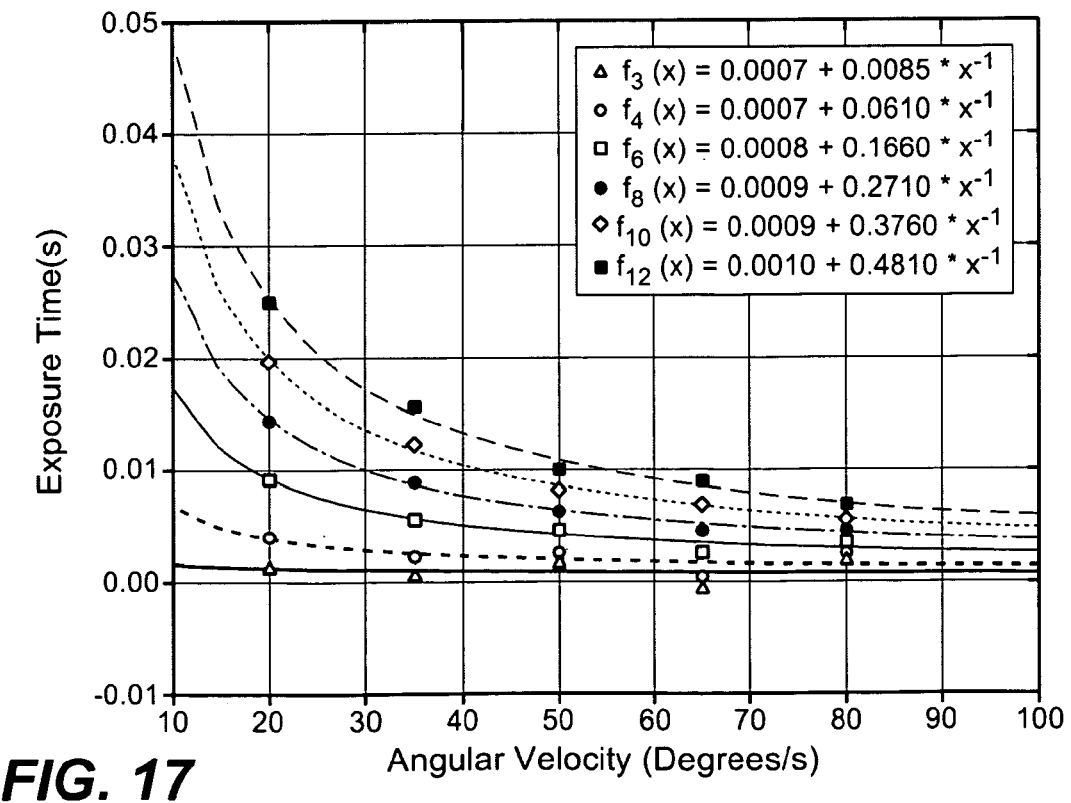
FIG. 17 is a graph showing relationships between exposure time and angular velocity for various acceptable blur extents.

Referring to FIG. 14, a number of combinations of focal lengths, angular velocities and exposure times are predetermined and used to configure the image capture device to capture test images (step 150). FIG. 15 shows an example of an array of test images taken at various combinations of exposure time and angular velocity for a particular focal length of the image capture device. Once the test images have been captured, an extent of blur is measured in each of the test images (step 152) and associated with respective ones of the combinations of focal length, angular velocity and exposure time. FIG. 16 is a graph showing relationships between exposure time and blur extent measured in the images of FIG. 15, for particular angular velocities. Combinations of angular velocity and exposure time are then associated with ones of predetermined acceptable levels of blur extent (which may be predetermined as a user-selectable range of discrete amounts by design) in order to relate angular velocity and exposure time for each acceptable blur extent level (step 154). FIG. 17 is a graph showing relationships between exposure time and angular velocity for various acceptable blur extents. The relationships such as those shown in FIG. 17 may be stored in the image capture device or elsewhere as discrete values in a lookup table (step 156). Alternatively they may be maintained as functions, depending on design considerations relating to processing and storage requirements, as would be understood.

In the first embodiment with reference to step 400 of FIG. 3, configuration of the image capture device with respect to maximum exposure time $E_{max}$ and required image intensity is made on the basis that the auto-exposure settings of the image capture device are over-ridden when the maximum exposure time $E_{max}$ is exceeded by the brightness-based automatic exposure time $E_{auto}$. Alternatives however, are available. For example, one alternative method 400a for configuring the image capture device given a maximum exposure time $E_{max}$, that does not rely on a separate auto-exposure function will now be described with reference to FIG. 18.

First, a number of variables are retrieved. The first set of variables is the minimum and maximum exposure times $E_{device\_min}$ and $E_{device\_max}$ supported by the image capture device (step 450). The second set of variables is the acceptable minimum and maximum intensity range settings $y_{min}$ and $y_{max}$, specified by a user or predetermined by design (step 452). A third variable is the user-specified exposure time step setting E_step (step 454).

A test image is then captured using a current exposure setting $E_{true}$ of the image capture device (step 456). An average intensity of pixels $y_{measured}$ in the captured test image is then measured (step 458). If $E_{true}$ is greater than $E_{max}$ (step 460), then $E_{true}$ is re-set to equal $E_{max}$ (step 462) because blur would otherwise occur that is greater than the blur extent limit. The process at and following step 456 is then re-iterated using the new $E_{true}$.

If at step 460 $E_{true}$ is not greater than $E_{max}$, then $E_{true}$ is compared to $E_{device\_min}$ (step 464). Should $E_{true}$ be less than $E_{device\_min}$, then the average intensity of pixels $y_{measured}$ is compared to the minimum intensity setting $y_{min}$ (step 466) to determine a re-set value of $E_{true}$ for re-iterating the process at and following step 456. In order to determine the re-set value, should $y_{measured}$ be greater than or equal to $y_{min}$, then $E_{true}$ is set to $E_{min}$ (step 470). On the other hand, should $y_{measured}$ be less than $y_{min}$, then $E_{true}$ is re-set to the lower of $E_{true}$+E_step, and $E_{max}$ (step 468).

If, at step 464, $E_{true}$ is not less than $E_{device\_min}$, then $y_{measured}$ is compared to $y_{max}$ (step 472). If $y_{measured}$ is greater than $y_{max}$, then $E_{true}$ is re-set to the greater of $E_{true}$–E_step, and $E_{min}$ (step 474) in order to bring the intensity closer to the acceptable range, and the process at and following step 456 is then re-iterated using the re-set $E_{true}$. If $y_{measured}$ is not greater than $y_{max}$, then $y_{measured}$ is compared to $y_{min}$ (step 476). If $y_{measured}$ is also greater than or equal to $y_{min}$, then both exposure time and intensity are within acceptable ranges, and the image may be captured using $E_{true}$ (step 482). On the other hand, if $y_{measured}$ is less than $y_{min}$, then should $E_{true}$ be equal to $E_{max}$ (step 478) no improving adjustments are possible, and the image may be captured using $E_{true}$ (step 482). Otherwise, $E_{true}$ is set to the lower of $E_{true}$+E_step, and $E_{max}$ (step 480) and the process is re-iterated at step 456.

Figure 18:
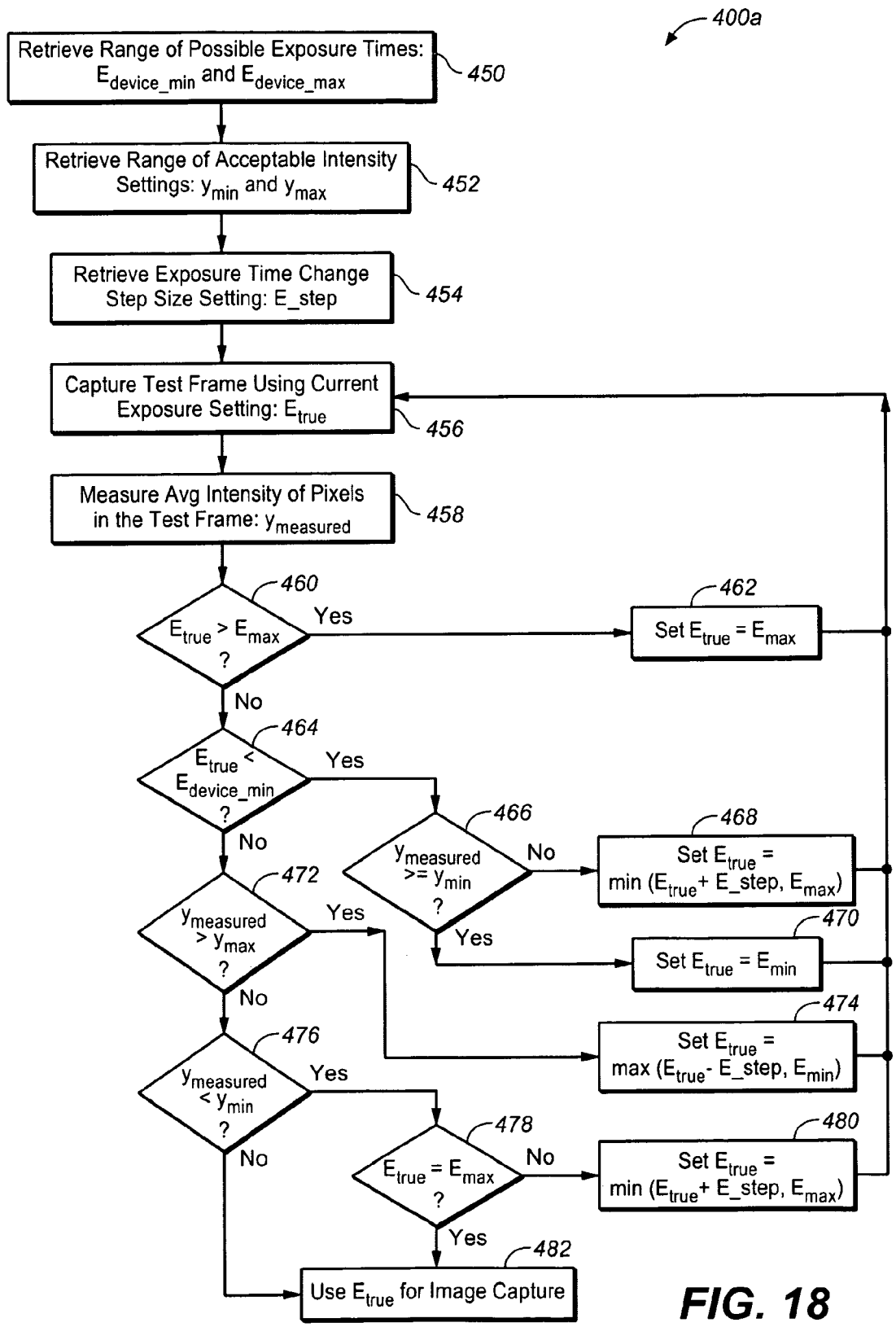
FIG. 18 is a flowchart showing alternative steps for configuring the image capture device based on the maximum exposure time and required image brightness settings.
Figure 19:
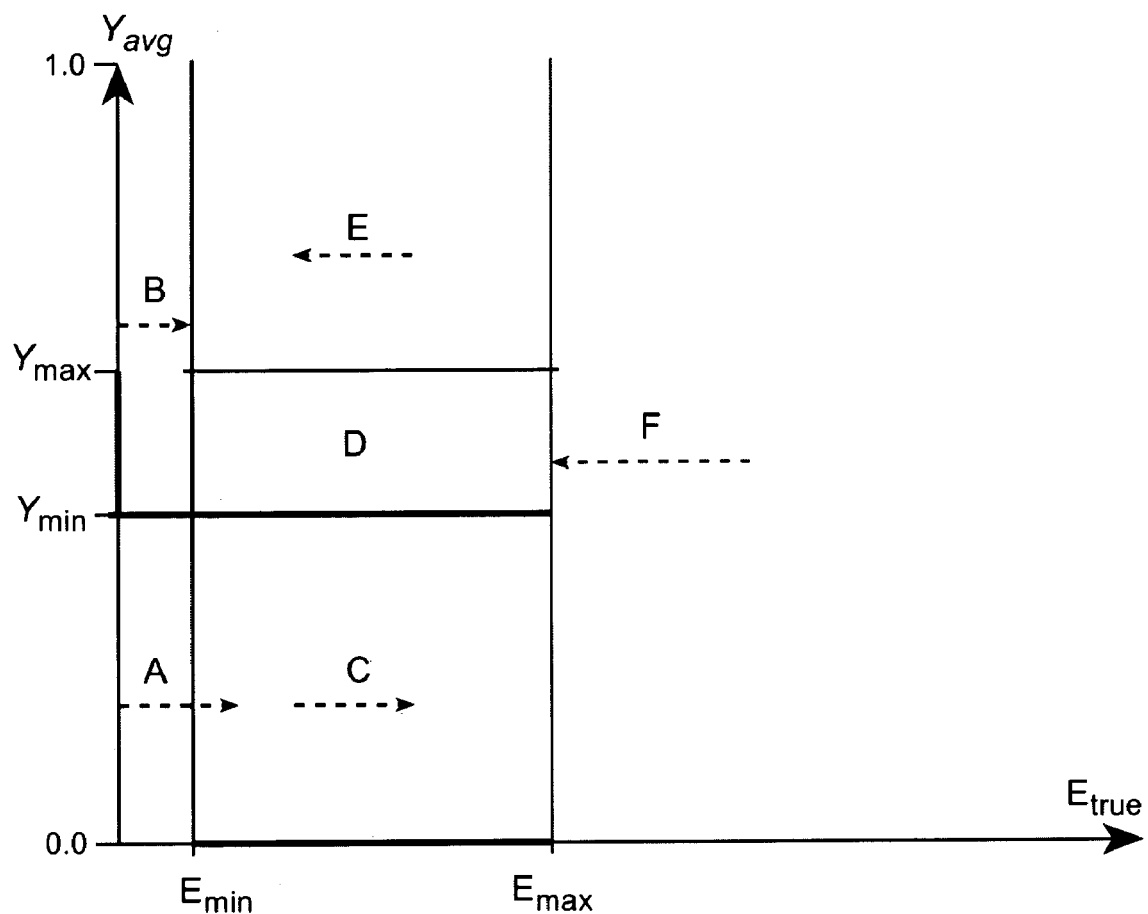
FIG. 19 is a graph of image intensity vs. exposure time illustrating the alternative steps of FIG. 16.

The process shown by flowchart in FIG. 18 may be better understood with reference to the graph of image intensity vs. exposure time illustrated in FIG. 19. The graph is sectioned into regions A-F, and each combination of $E_{true}$ and $y_{measured}$ falls into one region. The region into which a combination falls dictates the re-set value of exposure time, with the arrows representing the rules schematically:

A: $E_{true}$=min($E_{true}$+E_step, $E_{max}$)
B: $E_{true}$=$ex_{min}$
C: $E_{true}$=min($E_{true}$+E_step, $E_{max}$)
D: $E_{true}$ not changed; capture image
E: $E_{true}$=max($E_{true}$–E_step, $E_{min}$)
F: $F_{true}$=$E_{max}$ As will be understood, the operation of this alternative method 400a is similar to the operation of a standard auto-exposure function. That is, in regions C and E, exposure is adjusted based on image brightness. However, the method differs from typical auto-exposure systems in region F, where exposure is reduced regardless of image brightness.

Figure 20:
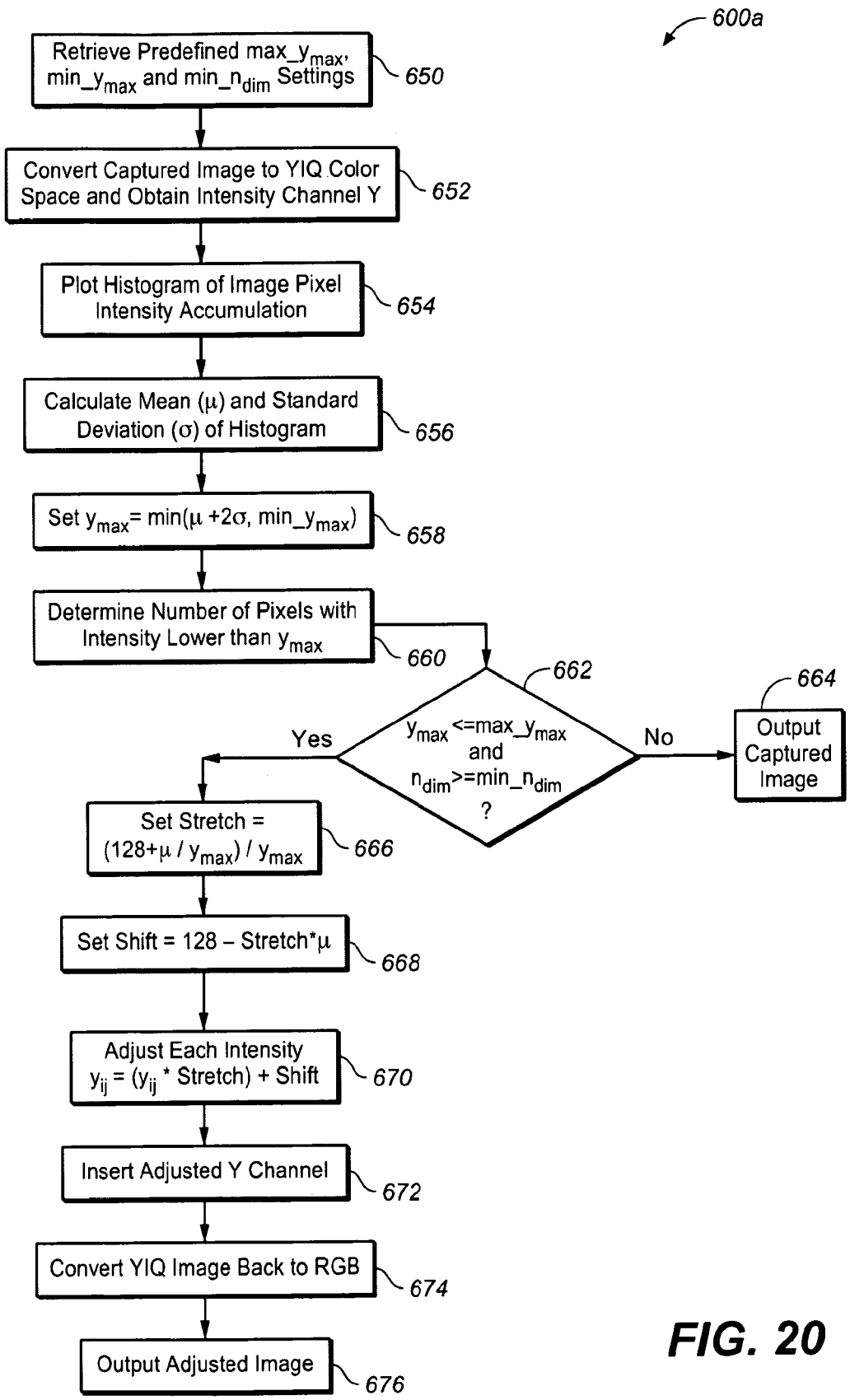
FIG. 20 is a flowchart showing alternative steps for processing the captured image to increase intensity.

Processing the captured image and in particular brightening the image where required has been described herein with reference to step 600 on the basis of a particular saturation model. Again, alternatives are available. For example, one alternative method 600a for brightening a captured image relies on shifting and stretching its histogram of pixel intensities as will now be described with reference to FIG. 20.

First, user pre-defined (i.e. adjustable) parameters max_$y_{max}$ and min_$y_{max}$ intensity values, and the min_$n_{dim}$ pixel percentage value are retrieved (step 650).

The max_$y_{max}$ intensity value is a histogram stretch upper threshold. A value $y_{max}$ is calculated so that most of the information in the image (i.e., pixels having an intensity within two (2) standard deviations of the mean intensity) has an intensity less than this $y_{max}$. The histogram will be stretched so that pixels with intensity>=$y_{max}$ are stretched to intensity 255. If $y_{max}$ is close enough to 255 already, (that is, if $y_{max}$>=max_$y_{max}$), then the image need not be further brightened—it is bright enough.

The min_$y_{max}$ value is a histogram stretch lower threshold. If $y_{max}$ is less than this value, the image appears very dim. Because stretching the histogram from the $y_{max}$ intensity would lead to an unnatural looking image, the histogram is stretched from the min_$y_{max}$ intensity.

An $n_{dim}$ value represents the percentage of pixels that will be stretched and shifted normally. The remaining 1–$n_{dim}$ pixels are saturated at 255. In order to minimize loss of detail, the brightening process does not attempt to brighten the image if $n_{dim}$ is less than min_$n_{dim}$. Otherwise, too many pixels would be saturated.

During testing, the following values were employed:

max_$y_{max}$=204;
min_$y_{max}$=128; and
min_$n_{dim}$=80%.

Once the predefined settings have been retrieved, the captured image is converted to YIQ space, and the intensity channel Y obtained (step 652). A histogram of pixel intensity accumulation is then created from the Y channel by grouping pixels according to their Y channel values (step 654).

Mean intensity ($\mu$) and standard deviation ($\rho$) values are calculated from the histogram (step 656), and the $y_{max}$ value is set (step 658) as follows:

$$y_{max}=\min(\mu+2\rho,\min\_y_{max}) \qquad (68)$$

Then, the number of pixels with intensity lower than $y_{max}$ is counted (step 660) and used to obtain a percentage of pixels $n_{dim}$ with intensity lower than $y_{max}$. In the event that the following condition is not true (step 662):

$$y_{max}<=\max\_y_{max} \text{ and } n_{dim}>=\min\_n_{dim} \qquad (69)$$

then there is no need to brighten the captured image, and the unprocessed captured image is output (step 664). If the condition at step 662 is true, then the histogram stretch factor is defined (step 666) as follows:

$$\text{stretch}=(128+\mu/y_{max})/y_{max} \qquad (70)$$

Similarly, the histogram shift factor is defined (step 668) as follows:

$$\text{shift}=128-\text{stretch}*\mu \qquad (71)$$

Using Equations (70) and (71), each pixel's intensity $y_{ij}$ is then adjusted (step 670) as follows to create a modified intensity channel Y:

$$y_{ij}=(y_{ij}*\text{stretch})+\text{shift} \qquad (72)$$

The modified intensity channel Y replaces the one extracted from the YIQ image (step 672) and the modified YIQ image is converted back into RGB (step 674) and output (step 676) as the post-processed image.

FIG. 21 is an array of images and corresponding pixel intensity histograms. An unprocessed captured image is shown with its histogram, and then processed images with first stretched, and then shifted histograms are shown. For comparison, an image taken using standard auto-exposure without limiting exposure time, and its corresponding histogram is also shown.

Although embodiments have been described, those of skill in the art will appreciate that variations and modifications may be made without departing from the spirit and scope thereof as defined by the appended claims.

What is claimed is:

1. A method of determining a maximum exposure time to limit motion blur during capture of an image with an image capture device, comprising:
    determining extents of image blur that result from respective combinations of movement rate and exposure time of the image capture device;
    in accordance with a predetermined blur extent limit and the combinations, deriving a relationship between movement rate and exposure time of the image capture device;
    measuring a movement rate of the image capture device; and
    based on the measured movement rate and the relationship, obtaining the maximum exposure time; and
    wherein the determining comprises:
        defining a model of correlation between movement of the image capture device relative to a subject and resultant blur extent in pixels; and
        calculating blur extents resulting from rates of movement of the image capture device over time using the model.

2. The method of claim 1, wherein the determining comprises:
   capturing a plurality of images using respective combinations of movement rate and exposure time of the image capture device; and
   measuring a blur extent in each of the captured images.

3. The method of claim 1, wherein the model of correlation is based on a simple lens model.

4. The method of claim 3, wherein the model of correlation is also based on pure rotation.

5. The method of claim 3, wherein the model of correlation comprises:
   a first transformation from world object coordinates to image capture device coordinates;
   a second transformation from image capture device coordinates to image plane coordinates;
   a third transformation from image plane coordinates to focal plane coordinates; and
   a fourth transformation from focal plane coordinates to image pixel coordinates.

6. The method of claim 5, wherein the first transformation is a rotation.

7. The method of claim 5, wherein the second transformation is a perspective projection.

8. The method of claim 5, wherein the third transformation is a scaling.

9. The method of claim 5, wherein the fourth transformation is a scaling.

10. The method of claim 1, wherein the calculating comprises:
    for each combination of movement rate and exposure time, obtaining a respective field of motion vectors for pixels in each of the X, Y and Z directions;
    for each field, determining an average motion vector; and
    calculating the magnitude of each average motion vector as a blur extent.

11. The method of claim 10, wherein each average motion vector is determined from a subset of the motion vectors in a respective field.

12. The method of claim 11, wherein the subset comprises nine motion vectors.

13. The method of claim 12, wherein the nine motion vectors are the left-top, middle-top, right-top, left-center, middle-center, right-center, left-bottom, middle-bottom and right-bottom vectors in a field.

14. The method of claim 10, wherein each average motion vector is determined by weighting motion vectors in a field in accordance with a respective proximity to the field center.

15. The method of claim 1, wherein the determined extents of image blur that result from respective combinations of movement rate and exposure time of the image capture device are stored in a table for each of the X, Y and Z directions.

16. The method of claim 15, wherein the relationship between movement rate and exposure time of the image capture device is determined by obtaining the greatest exposure time in each table for each movement rate that would result in a blur extent being no greater than the predetermined blur extent limit.

17. The method of claim 16, wherein movement rates in each of the X, Y and Z directions are indices in an exposure limit lookup table.

18. The method of claim 17, wherein the indices are non-linearly spaced to provide a higher proportion of table entries at lower movement rates.

19. The method of claim 1, wherein the movement rate is angular velocity.

20. A method of capturing an image with an image capture device, comprising:
    determining a movement rate of the image capture device;
    on the basis of the movement rate and a blur extent limit, obtaining a maximum exposure time from a predetermined relationship between movement rate and exposure time for the image capture device;
    exposing an image sensor of the image capture device to capture an image, the exposing being limited in duration by the maximum exposure time;
    automatically adjusting at least one of an aperture size of the image capture device and a sensitivity of the image sensor to thereby effect exposure level; and pg,37
    in the event that a measure of intensity of the captured image is less than a predetermined threshold, automatically increasing the intensity value of at least a portion of pixels in the captured image.

21. An apparatus for determining a maximum exposure time to limit motion blur during capture of an image with an image capture device, comprising:
    a processor determining extents of image blur that result from respective combinations of movement rate and exposure time of the image capture device and, in accordance with a predetermined blur extent limit and the determined combinations, deriving a relationship between movement rate and exposure time of the image capture device;
    a storage device storing the relationship;
    a measuring device that measures a movement rate of the image capture device; and
    a lookup module determining from the relationship stored on the storage device the maximum exposure time based on the measured movement rate and the predetermined blur extent limit.

22. The apparatus of claim 21, wherein the processor performs the determining by:
    capturing a plurality of images using respective combinations of movement rate and exposure time of the image capture device; and
    measuring a blur extent in each of the captured images.

23. The apparatus of claim 21, wherein the processor performs the determining by:
    defining a model relating movement of the image capture device relative to a subject and resultant blur extent in pixels; and
    calculating blur extents resulting from rates of movement of the image capture device over time using the model.

24. The apparatus of claim 21, wherein the measuring device is a gyro.

* * * * *

UNITED STATES PATENT AND TRADEMARK OFFICE
CERTIFICATE OF CORRECTION

PATENT NO. : 7,509,038 B2
APPLICATION NO. : 11/239521
DATED : March 24, 2009
INVENTOR(S) : Eunice Poon et al.

Page 1 of 1

It is certified that error appears in the above-identified patent and that said Letters Patent is hereby corrected as shown below:

Title Page,
References Cited
U.S. Patent Documents

Please change "2002/0180874" to --2002/0180876--

Column 24,
Line 21, please change "effect" to --affect-- and please delete "pg,37"

Signed and Sealed this

Second Day of June, 2009

JOHN DOLL
*Acting Director of the United States Patent and Trademark Office*